United States Patent [19]

Stanciu et al.

[11] Patent Number: 5,316,707
[45] Date of Patent: May 31, 1994

[54] INJECTION MOLDING APPARATUS CONTROL SYSTEM AND METHOD OF INJECTION MOLDING

[75] Inventors: Virgil V. Stanciu, Rocky River; Jack R. Peshek, Avon Lake; Faurice D. Neece, Lyndhurst; Erik R. Kubulins, Strongsville; Branko Logozar, Cleveland, all of Ohio

[73] Assignee: Tempcraft, Inc., Cleveland, Ohio

[21] Appl. No.: 755,150

[22] Filed: Sep. 5, 1991

[51] Int. Cl.$^5$ .............................................. B29C 45/76
[52] U.S. Cl. ............................ 264/40.1; 264/328.14; 425/135; 425/145; 425/162; 425/169; 364/476
[58] Field of Search ............. 264/40.1, 40.5, 40.4, 264/328.1, 328.4, 328.19; 425/135, 145, 146, 159, 162, 169, 170, 171; 364/476

[56] References Cited

U.S. PATENT DOCUMENTS

| | | | |
|---|---|---|---|
| 3,859,400 | 1/1975 | Ma | 425/145 |
| 4,120,922 | 10/1978 | Lemelson | 425/145 |
| 4,274,823 | 6/1981 | Stanciu et al. | 425/149 |
| 4,407,649 | 10/1983 | Saito | 425/145 |
| 4,600,374 | 7/1986 | Brugger | 425/135 |
| 4,708,620 | 11/1987 | Brugger | 425/145 |
| 4,745,541 | 5/1988 | Vaniglia et al. | 364/141 |
| 4,806,089 | 2/1989 | Neko | 425/145 |
| 4,971,547 | 11/1990 | Nett, Jr. et al. | 425/135 |
| 5,035,598 | 7/1991 | Fujita et al. | 425/145 |
| 5,062,052 | 10/1991 | Sparer et al. | 425/135 |

FOREIGN PATENT DOCUMENTS

| | | | |
|---|---|---|---|
| 3407040 | 8/1984 | Fed. Rep. of Germany | 364/476 |
| 61-53020 | 3/1986 | Japan | 364/476 |
| 86/06322 | 11/1986 | World Int. Prop. O. | 364/476 |

Primary Examiner—Jill L. Heitbrink
Attorney, Agent, or Firm—Oldham, Oldham & Wilson

[57] ABSTRACT

There is shown an injection molding apparatus, which comprises a source of a fluid molding material and a molding die into which the molding material is forced under pressure. The apparatus includes a control means for initiating and controlling an injection cycle in which the fluid molding material is injected into the molding die in a particular and predetermined manner. The control means generally comprises a programmable logic controller (PLC) which is programmed to receive signals from sensors adapted to sense variable parameters of the injection cycle. The PLC is programmed to generate control signals based upon the signals from the sensors so as to control the variable parameters of the injection cycle. The output control signals of the PLC are coupled through an interface circuit to a servo-control circuit which in turn is operatively coupled to control various parameters of the injection cycle. The control system allows the user to pre-set multiple flow rates to accomplish desired acceleration/deceleration characteristics during the injection cycle so as to optimize fabrication of high quality patterns while reducing scrap patterns. The control system may also be implemented to prevent a machine operator from making unauthorized changes of injection parameters to assure the integrity of injection parameters on a continuous basis. The use of a high level PLC also enables generation and collection of data relevant to the injection processes to visually monitor the process dynamic parameters, to display an injection profile with tolerances, to facilitate diagnostics as well as other valuable functions.

28 Claims, 13 Drawing Sheets

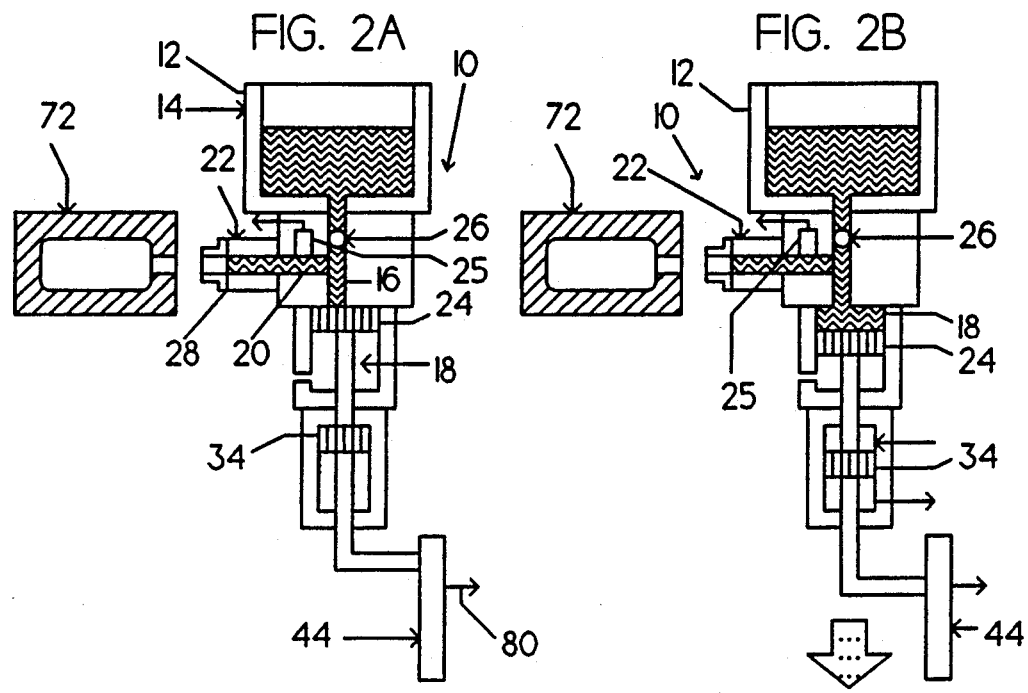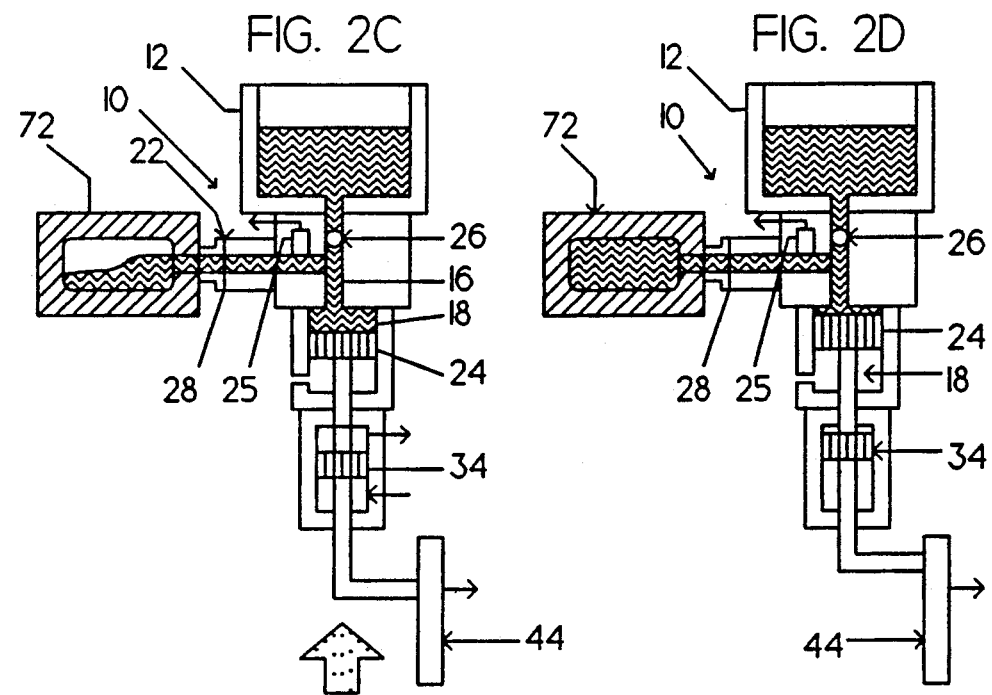

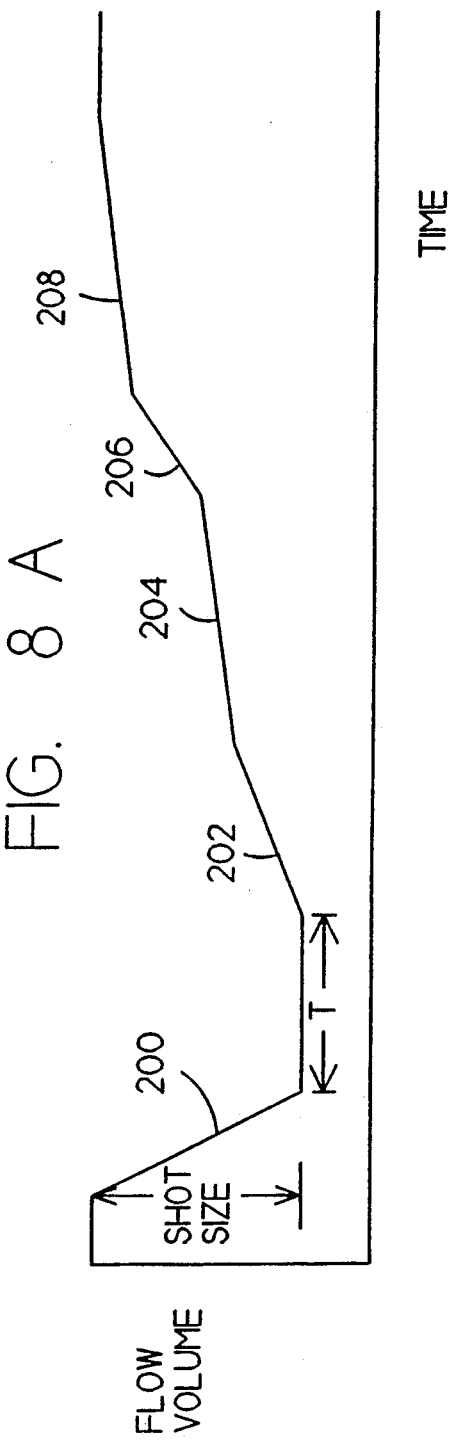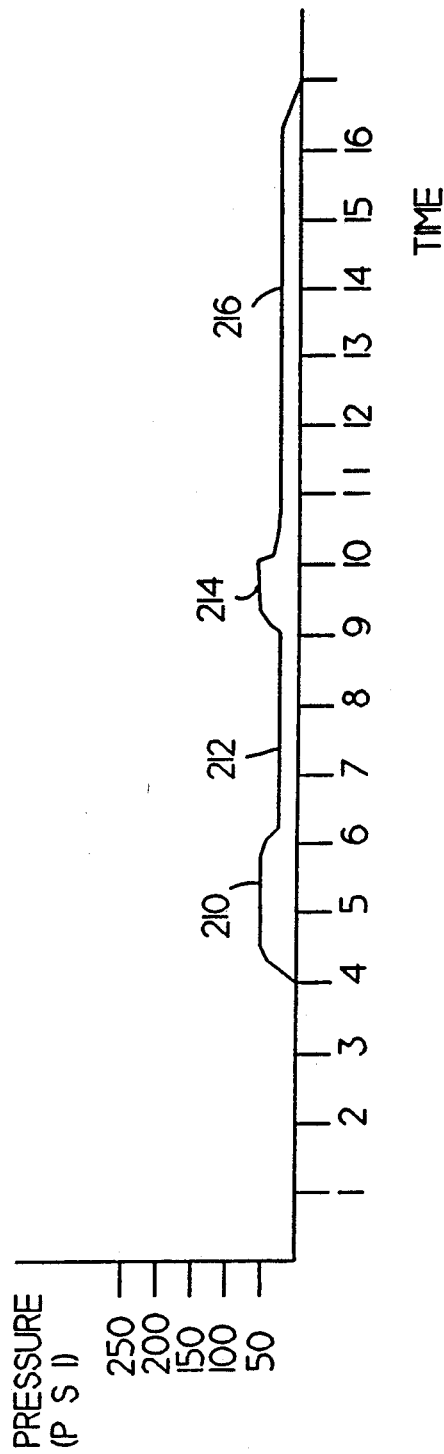

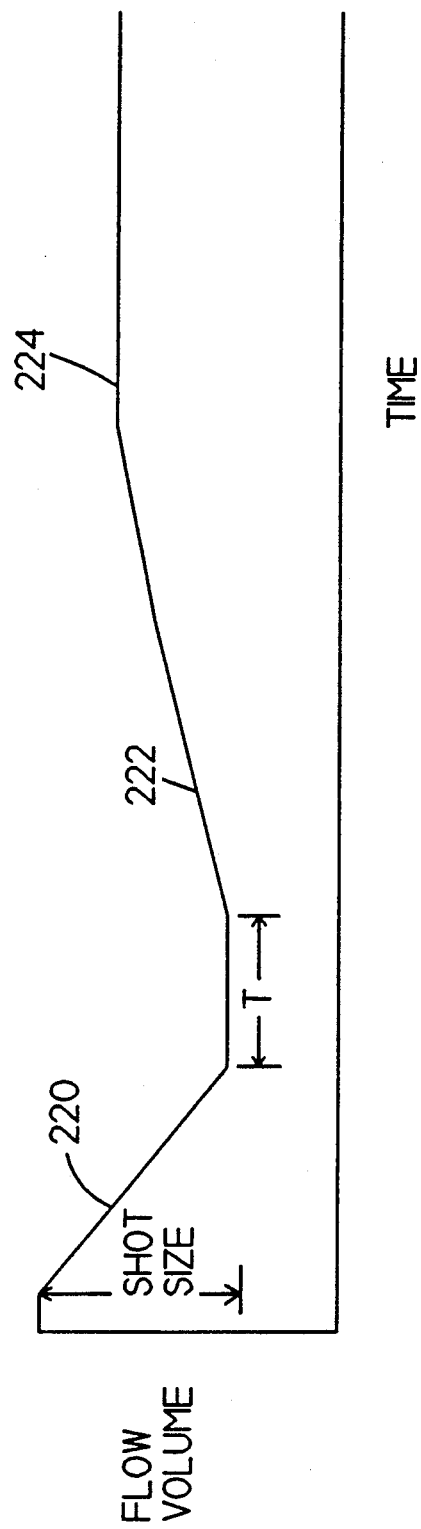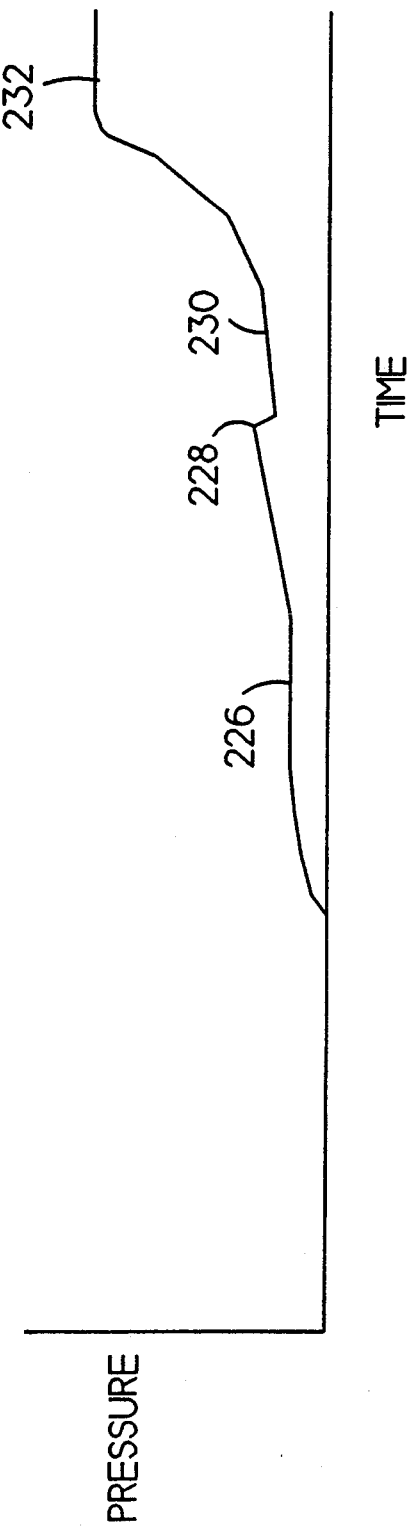

INJECTION MOLDING APPARATUS CONTROL SYSTEM AND METHOD OF INJECTION MOLDING

BACKGROUND OF THE INVENTION

The present invention relates generally to an injection molding apparatus and process of injection molding utilizing a novel control system which allows dynamic parameters of the injection process to be more accurately and easily controlled and which enhances the flexibility of operation of the apparatus. More particularly, the invention is directed to an injection molding apparatus and process of injection molding which utilizes a programmable logic controller to control certain variable dynamic parameters encountered in an injection molding process such as for example, the making intricate disposable wax patterns or the like for use in metal casting techniques.

In various injection molding procedures, it has been found that control over the injection process is less than adequate, resulting in defective molding which renders the procedure less efficient and adds to the cost thereof. It is desired in injection molding techniques such as die casting, plastic injection and wax injection techniques to provide a greater amount of control and flexibility in the injection process to enable more efficient, cost-effective production and manufacturing capabilities. For example, in metal casting techniques, such as investment casting, disposable wax patterns are utilized to generate a mold form used in the metal casting process. A molten metal will be poured into the mold form to produce metal castings which are often intricate in their geometry and require close tolerances with respect to characteristics such as dimension and surface finish. In the investment casting process, a disposable wax pattern is formed and thereafter covered with one or more layers of a suitable "investment" materials, such as a ceramic material, wherein the coating is permitted to solidify about the wax pattern. The wax pattern may then be removed by melting or dissolving the wax to leave a mold cavity in the investment material, being an exact replica of the wax pattern and having the desired intricate geometry and close tolerances of the metal part to be cast therein. Conventionally, such disposable wax patterns are produced by injecting a specially formulated liquid wax into a master mold using an injection molding apparatus, wherein the injected wax will be solidified under pressure within the master mold by means of the injection molding apparatus.

The intricate disposable wax patterns for use in investment casting or other metal casting techniques must be of high quality in order to be used to generate a suitable mold cavity as described. Similarly, cost effective production of such disposable wax patterns requires a high degree of uniformity and reduction of scrap patterns produced in the injection molding apparatus. As the intricate metal parts to be cast are configured in a broad range of size, geometry and other specifications, the master molds utilized for production of the disposable wax patterns similarly vary over a wide range. The broad variations in the size, geometry, orientation and runner systems of the various master molds require that the injection molding apparatus be capable of a great amount of flexibility, so as to be applicable for use in fabricating the desired wax pattern. The quality and uniformity of wax patterns produced in this manner are directly related to the ability of the injection molding apparatus to accurately control parameters of the pattern molding process. For example, the dynamics of fluid flow and pressure must be controlled with a high degree of accuracy to produce acceptable and desired wax patterns. As a wide variety of molds are to be used in the fabrication of wax patterns, a similar wide variety of wax flow characteristics and injection pressure control must be achievable in the wax injection molding apparatus. Similar criteria exist for various die casting, plastic injection and other injection molding techniques.

It is also been found that in many instances the final metal part to be cast includes hollow portions, requiring the wax pattern to be molded about a fragile ceramic core to enable production of such hollow castings. In such instances, the lack of adequate control of wax flow and pressure may result in breakage and/or structural damage of the fragile ceramic core thereby producing an unacceptable wax pattern. Further, in the wax injection process or any other injection molding process, the lack of adequate control in the injection process may also result in such imperfections as air bubbles, wax flow lines, knit lines, cracking or fracturing, incomplete fill, sink, incorrect size or dimensions and various other surface imperfections which may result in unusable patterns.

Various injection molding apparatus have been developed, as for example for use in fabrication of expendable wax patterns used in investment casting techniques, such as the assignees prior U.S. Pat. No. 4,274,823. The injection molding apparatus shown in this patent included a control system which allowed a high degree of control to be obtained over injection parameters such as the acceleration, maximum flow velocity and maximum pressure of the liquid wax with a high degree of accuracy throughout the injection and solidification cycle. A servo-control system was described which was operable to continuously monitor and variably control dynamic parameters of the injection molding cycle to achieve a high degree of quality and uniformity of the produced wax patterns. Although the wax injection molding apparatus greatly improved with the ability to properly fabricate desired disposable wax pattern for use in metal casting techniques in a cost effective manner, the apparatus comprised a dedicated system, wherein limitations for application of the system have been encountered. Under many circumstances, the wax injection molding apparatus of this prior patent was set up to act as a stand-alone dedicated machine capable of fabricating a single selected pattern with a high degree of quality and uniformity. It has been found that the basic inability to customize the wax injection molding apparatus to various needs of the user simply and effectively resulted in the need to provide a separate injection molding apparatus for each master mold to be used. It has also been found with the prior art injection apparatus, that the operator of the apparatus had the ability to modify the injection parameters to some degree, which may have resulted in less than adequate fabrication of the patterns if the operator was not extremely knowledgeable about the injection process. It has also be found to be desirable to provide the user with the ability to monitor operation of the injection molding apparatus and provide feedback to the user to allow optimization of the pattern fabrication process.

SUMMARY OF THE INVENTION

Based upon the foregoing, there has been found a need to provide an injection molding apparatus and control system which allows the user a greater amount of flexibility and enables the injection apparatus to be customized to the users needs and for a variety of different applications. It is therefore a main object of the invention to provide a injection molding apparatus having a control system for accurately controlling process parameters of an injection cycles such as acceleration/deceleration, flow velocity, pressure of the injection material and other machine functions to improve quality, reduce core breakage or otherwise optimize the injection process.

Another object of the invention is to provide an injection molding apparatus having a control system which allows a wide variety of process parameters to be effectively controlled, such that the apparatus can be used in the fabrication of a wide variety of patterns in different injection molding processes in an easy and convenient manner.

Another object of the invention is to provide an injection molding apparatus and control system which allows set up of a plurality of die recipes for various master mold dies to be used in conjunction with the apparatus, wherein any of the die recipes may be chosen and machine set up is provided automatically for a particular die.

Yet another object of the invention is to provide an injection molding apparatus and control system which allows visual monitoring of the dynamic parameters in the injection process, and automatically indicates any deviation from a predefined injection profile and given tolerance band about such a profile.

It is yet another object of the invention to provide an injection molding apparatus and control system which allows the user to compare the function of the apparatus over time with respect to patterns produced thereby, to facilitate trouble shooting any problems which may arise in the fabrication process.

Another object of the invention is to provide an injection molding apparatus and control system which allows the user to set up operation of the apparatus and to prevent modification of the dynamic parameters encountered in the molding process.

Still another object of the invention is to provide a wax injection molding apparatus and control system which will facilitate generation of various reports regarding production control and quality control in the molding fabrication process.

Another object of the invention is to provide an injection molding apparatus control system which allows the user to pre-set multiple flow rates to accomplish acceleration or deceleration of the flow during an injection cycle, wherein such multiple flow rates may be related to time, material back pressure or both during the injection process.

Yet another object of the invention is to provide an injection molding apparatus control system which allows the apparatus to be networked with a plurality of other injection molding apparatus by means of a central computing facility which allows monitoring and control of each of the wax injection molding apparatus from the central control facility.

Another object of the invention is to provide a method of injection molding utilizing a novel control system wherein process parameters and variable parameters of an injection cycle are closely monitored and controlled for more efficient, cost-effective fabrication.

These and other objects of the invention are accomplished by means of an injection molding apparatus control system which is capable of producing injection molded parts such as disposable wax patterns or the like wherein the control system including a high level programmable logic controller (PLC) to control all of the various dynamic parameters which may be encountered in the process of molding intricate patterns or the like. The control system including the PLC is capable of storing a plurality of master mold die recipes, each of the recipes being identifiable and being capable of being down loaded to the apparatus for automatic parameter set up. The ability to down load a particular die recipe will reduce set up time and ensure that the proper process parameters are implemented for producing high quality patterns. The control system of the injection molding apparatus allows a system to be customized to the users needs and provide the system which is not only flexible but provides extended injection capability from a particular machine so as to be much more versatile. The control system allows the user to pre-set multiple flow rates to accomplish desired acceleration/deceleration characteristics during the injection cycle so as to optimize fabrication of high quality patterns while reducing scrap patterns. The control system may also be implemented to prevent a machine operator from making unauthorized changes of injection parameters to assure the integrity of injection parameters on a continuous basis. The use of a high level PLC also enables generation and collection of data relevant to the injection processes to visually monitor the process dynamic parameters, to display an injection profile with tolerances, to facilitate diagnostics as well as other valuable functions. The collection of such data may also facilitate analysis of the fabrication process to facilitate production and quality control as well as to implement preventative maintenance systems and ensure machine operation is consistent over time. Another aspect of the invention is found in that the control system of a particular injection molding apparatus may be networked into a central control facility, wherein a plurality of injection machines may be easily and effectively controlled from a central location to ensure optimization of the injection processes for each of the injection machines.

In general, the invention provides an injection molding apparatus, which comprises a source of a fluid molding material and a molding die into which the molding material is forced under pressure. The apparatus includes a control means for initiating and controlling an injection cycle in which the fluid molding material is injected into the molding die in a particular and predetermined manner. The control means generally comprises a programmable logic controller (PLC) which is programmed to receive signals from sensors adapted to sense variable parameters of the injection cycle. The PLC is programmed to generate control signals based upon the signals from the sensors so as to control the variable parameters of the injection cycle. The output control signals of the PLC are coupled through an interface circuit to a servo-control circuit which in turn is operatively coupled to control various parameters of the injection cycle, such as the velocity and acceleration of an injection ram, the injection cycle time, the temperature of the fluid molding material, the characteristics of the molding die or platens associated therewith, as well as a variety of other variable dynamic parameters of the injection cycle. The use of a PLC enables a variety of distinct advantages to be obtained, such as allowing the user to program the process parameters for a plurality of mold dies directly into the PLC, such that the process parameters for a particular die may be easily and conveniently called up to reduce set up time in using a particular die. The PLC also includes a memory capacity which allows information regarding the injection process to be collected and stored so as to increase the capability to generate and collect data regarding injection processes for use by management, engineering or otherwise. In this way, the injection molding apparatus has improved cost performance, is easier to operate and provides improved process control capabilities.

It has additionally been found that the use of the PLC allows process parameters for a particular mold die to be initially set up and thereafter prevents changing such process parameters, except by authorized personnel, so as to ensure continuity in fabricated parts, and improve the reliability of the injection process. The use of a PLC also facilitates maintenance and diagnostic analysis of the injection apparatus so as to reduce problems or possible down time of the apparatus.

BRIEF DESCRIPTION OF THE DRAWINGS

These and other objects and advantages of the invention will become apparent upon a further reading of the detailed description in conjunction with the drawings, wherein:

FIGS. 2a–2d are diagrammatic views in vertical section of the injection molding process accomplished with the apparatus in showing various steps of the injection process;

FIGS. 8a and 8b show flow and pressure profiles for the acceleration/deceleration function of FIG. 7;

FIGS. 10a and 10b show flow and pressure profiles for the acceleration/deceleration function of FIG. 9.

DETAILED DESCRIPTION OF THE INVENTION

Figure 1:
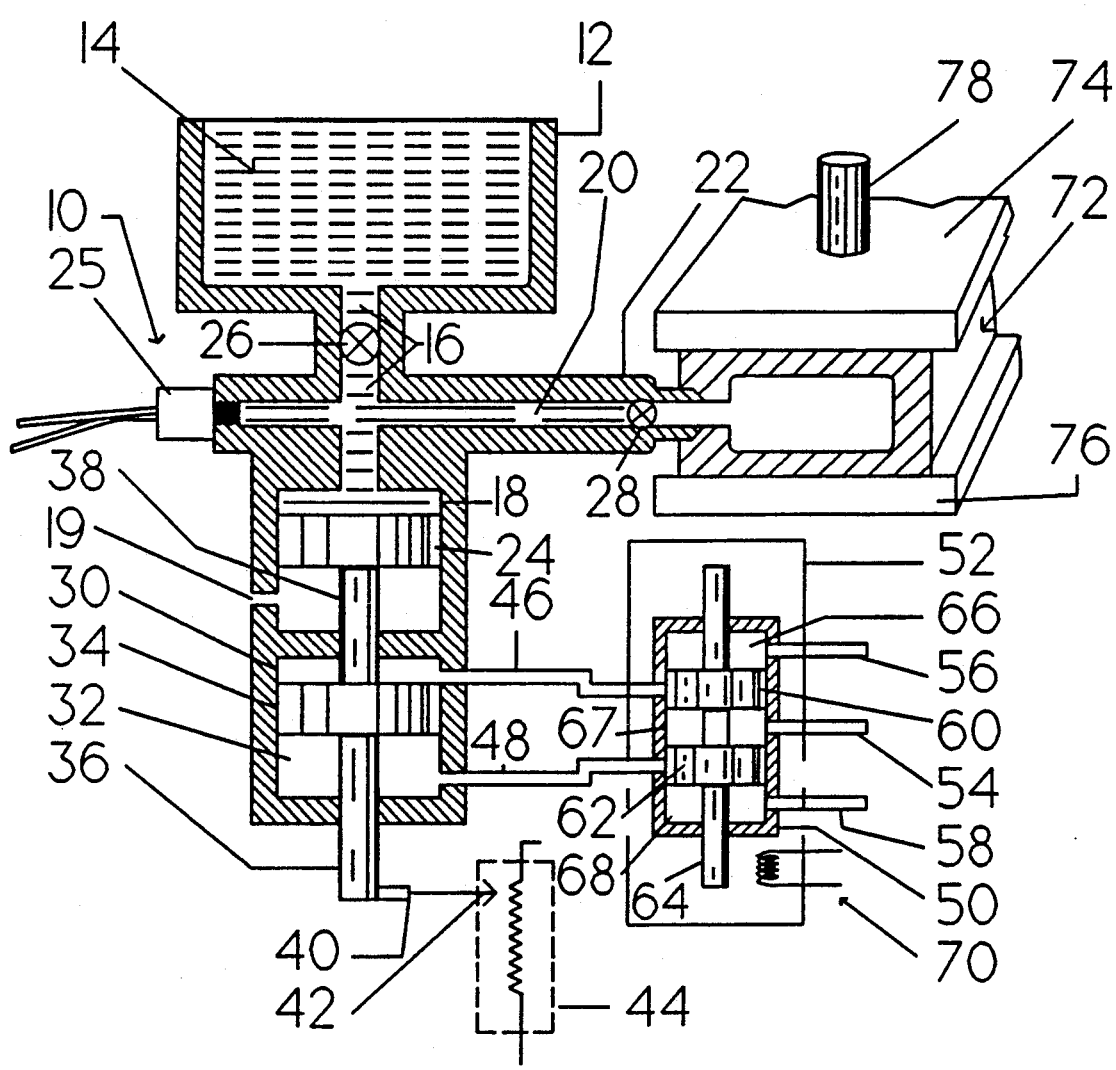
FIG. 1 is a diagrammatic view in vertical section of the basic assembly of an injection molding apparatus in accordance with the invention.

Referring now to the figures, the injection molding apparatus of the invention will be described with reference to a wax injection molding process, but it should be recognized that the apparatus is also usable in other injection processes, such as die casting and plastic injection techniques for example. The injection molding apparatus is shown diagrammatically in FIG. 1, and is generally of the structure as shown and described in the assignees prior U.S. Pat. No. 4,274,823. The injection molding apparatus generally indicated at 10 comprises a reservoir 12 which will hold a fluid molding material 14, such as a molding wax, wherein the reservoir 12 is open to the atmosphere and connected to a fluid passage opening 16. A suitable heating and/or agitating means (not shown) may be disposed in the reservoir 12 to maintain the fluid molding material 14 in a fluid condition and at a temperature suitable for injection molding. The passage 16 communicates at its lower end to a chamber 18 as well as a second fluid passage 20 which is formed centrally in movable nozzle means 22 of the molding apparatus 10. Within the chamber 18, is positioned an injection ram 24 movable within the chamber 18 so as to act on any fluid molding material therein. A first valve 26 is positioned within fluid passage 16, wherein the location of the valve 26 is diagrammatically illustrated in FIG. 1. The valve 26 is intended to allow or cut off flow of the fluid molding material 14 from the reservoir 12 into the wax injection chamber 18. Similarly, a second valve 28 is positioned within fluid channel 20 of the movable nozzle 22 and is intended to seal the nozzle opening or allow flow of the fluid molding material therethrough. A pressure transducer 25 is shown schematically in coupling relation to fluid channel 20 of the injection nozzle. The pressure transducer 25 will provide an indication of the back pressure on the fluid molding material flowing through injection nozzle 22, and may be used to control an injection cycle as will be hereinafter described. It should be understood that the fluid molding material may be drawn into injection chamber 18 by opening valve 26 and retracting ram 24 within chamber 18. The wax or other suitable molding material will also be drawn into channel 20 with valve 28 closed to prevent further flow of the material out of nozzle 22. Retraction of ram 24 is accomplished by means of hydraulic actuation, and may comprise hydraulic chambers 30 and 32 separated by a piston 34 connected to piston rods 36 and 38. Piston rod 38 is operatively connected to ram 24, such that upon movement of piston 34, corresponding movement of ram 24 within chamber 18 will occur. Movement of ram 24 within chamber 18 is also facilitated by a vent 19 provided in association with chamber 18. Similarly, movement of piston 34 will result in corresponding movement of piston rod 36, which has coupled therewith a potentiometer slider 40 and slider arm 42 of a linear potentiometer 44 adapted to monitor movement of piston arm 36 and therefore movement of injection ram 24.

The hydraulic actuation system for injection ram 24 comprises a suitable hydraulic pump and hydraulic control system generally comprising hydraulic feed conduits 46 and 48, each of which communicates with one of the hydraulic chambers 30 and 32 respectively. The conduits 46 and 48 are in turn coupled to a hydraulic valve housing 50 of a servo-valve assembly 52. The valve housing 50 communicates with a hydraulic supply conduit 54 and exhaust conduits 56 and 58, each of which communicates with a suitable hydraulic fluid source or sump. Within the valve housing 50 are provided a spool valve 64 having two raised spool elements 60 and 62 formed thereon in spaced relation to one another so as to divide the interior of housing 50 into three chamber 66, 67 and 68, which will be of variable volume depending upon the position of spool valve 64. Each of the chambers 66–68 in turn communicates with the supply conduit 54 or exhaust conduits 56 and 58 respectively, and chamber 66 and chamber 67 may in turn communicate with feed conduit 46 to supply or exhaust hydraulic fluid from hydraulic chamber 30 depending upon the position of spool valve 64. Similarly, chambers 67 and 68 may communicate with feed conduit 48 to allow supply or exhaust of hydraulic fluid from hydraulic chamber 32 depending upon the position of spool valve 64. The spool valve 64 is movable within housing 50 by means of an injection servo-valve coil 70, and as should be recognized will supply hydraulic fluid to one of the hydraulic chambers 30 or 32 to initiate retraction or extension of ram 24 in conjunction with piston 34 and piston rods 36 and 38.

In operation of the injection molding apparatus 10, the movable nozzle 22 is positioned within a nozzle opening of a suitable mold die 72, which in turn may be properly positioned with respect to nozzle 22 by means of upper and lower platens 74 and 76 respectively. The upper platen 74 may be movably supported on the injection molding apparatus and vertically movable toward and away from the lower platen 76 so as to clamp the injection mold die 72 therebetween. A suitable hydraulically actuated jack 78 may be utilized to raise and lower the upper platen 74 with respect to lower platen 76. The basic structure of the injection molding apparatus 10 is described in more detail in the assignees prior U.S. Pat. No. 4,274,823, which is hereby incorporated herein by reference.

Referring now to FIGS. 2a–2d, operation of the injection molding apparatus 10 will be described with respect thereto. As seen in FIG. 2a, the initial "at rest" position of the injection molding apparatus 10 is shown diagrammatically, wherein the fluid molding material 14, such as a molding wax, is maintained in a liquified state within reservoir 12. The reservoir valve 26 is maintained in an open position such that wax is able to flow within channels 16 and 20, but the nozzle valve 28 is closed to prevent flow of the material from the nozzle 22. Flow of material from channel 16 into injection chamber 18 is inhibited by the fully extended position of injection ram 24 by means of hydraulic fluid acting on piston 34 within the hydraulic chamber. The position of the injection ram 24 is monitored by means of the position sensor or linear potentiometer 44 and feedback of this position is supplied to the control system of the injection apparatus as indicated by arrow 80. Similarly, the pressure of the molding material within injection nozzle 22 is monitored by the pressure transducer 25 and feedback from the pressure sensor 25 is supplied to the control system of the apparatus. The injection molding die 72 is not coupled to the injection nozzle at this point, and the status of the apparatus may be maintained in this configuration for an indefinite amount of time.

Upon initiation of an injection cycle, the hydraulic actuation system supplies a hydraulic fluid to operate on piston 34 within the hydraulic chamber so as to move piston 34 downwardly as indicated in FIG. 2b. Hydraulic fluid within the hydraulic chamber below piston 34 will be exhausted therefrom, such that as piston 34 moves downwardly, the injection ram 24 will also move downwardly so as to draw material into injection chamber 18. The position of injection ram 24 is again monitored by means of position sensor 44 as injection chamber 18 is filled. Once injection chamber 18 is filled with the proper amount of molding material, the molding die 72 may be coupled to injection nozzle 22 as seen in FIG. 2c, such that the injection process can begin. For injection of the molding material, the reservoir valve 26 is closed and the injection nozzle valve 28 is opened as seen in FIG. 2c. Injection of the material from injection chamber 18 may then be performed by means of upward movement of injection ram 24 upon actuation of the hydraulic system in which hydraulic fluid is supplied below piston 34 and exhausted from an upper portion of the hydraulic cylinder to cause upward movement of piston 34. Upon upward movement of piston 34, the injection ram 24 will be moved upwardly and material within injection chamber 18 will be forced through passage 16 and into injection nozzle 22 so as to be fed into molding die 72. Again, the position of the injection ram 24 is continuously monitored by means of position sensor 44 and the pressure of the material flowing through injection nozzle 22 is also continuously monitored by pressure sensor 25. It should be understood that the speed at which injection ram moves upwardly can be controlled so that material can be injected into the molding die 72 at a pre-selected flow rate and acceleration. Similarly, as the mold cavity of molding die 72 becomes completely filled, the back pressure of the material can be continuously monitored for precise control of the injection process. As seen in FIG. 2d, the injection process is continued until the mold die 72 is completely filled, wherein a pre-selected pressure may be maintained on the material within die 72 during a solidification cycle of the molded pattern.

It has been found that the quality and uniformity of molded patterns, such as disposable wax patterns, are directly related to the ability of the injection machine 10 to accurately control the parameters of the pattern molding process, specifically the dynamics of fluid flow and pressure. The broad variation in size, geometry, orientation and runner systems of various molding dies 72 require that correspondingly wide variations in wax flow characteristics and injection pressure control be available by means of the injection apparatus. As previously mentioned, the further aspect that some wax patterns are to be molded around fragile ceramic cores to produce hollow castings, require precise control of wax acceleration, flow and injection pressure to eliminate breakage of the ceramic core which may be caused by excessive pressures or wax flow. Additionally, the lack of adequate control of flow and pressure may result in such pattern imperfections as air entrapment, flow lines, knit lines, cracking, incomplete fill, sink or cavitation, incorrect size, core breakage, and various other surface imperfections causing the pattern to be unusable. In the injection molding apparatus 10, the control system provides a means of controlling the acceleration, maximum flow velocity, maximum pressure and other parameters with a high degree of accuracy throughout the injection and solidification cycles as desired.

Figure 3:
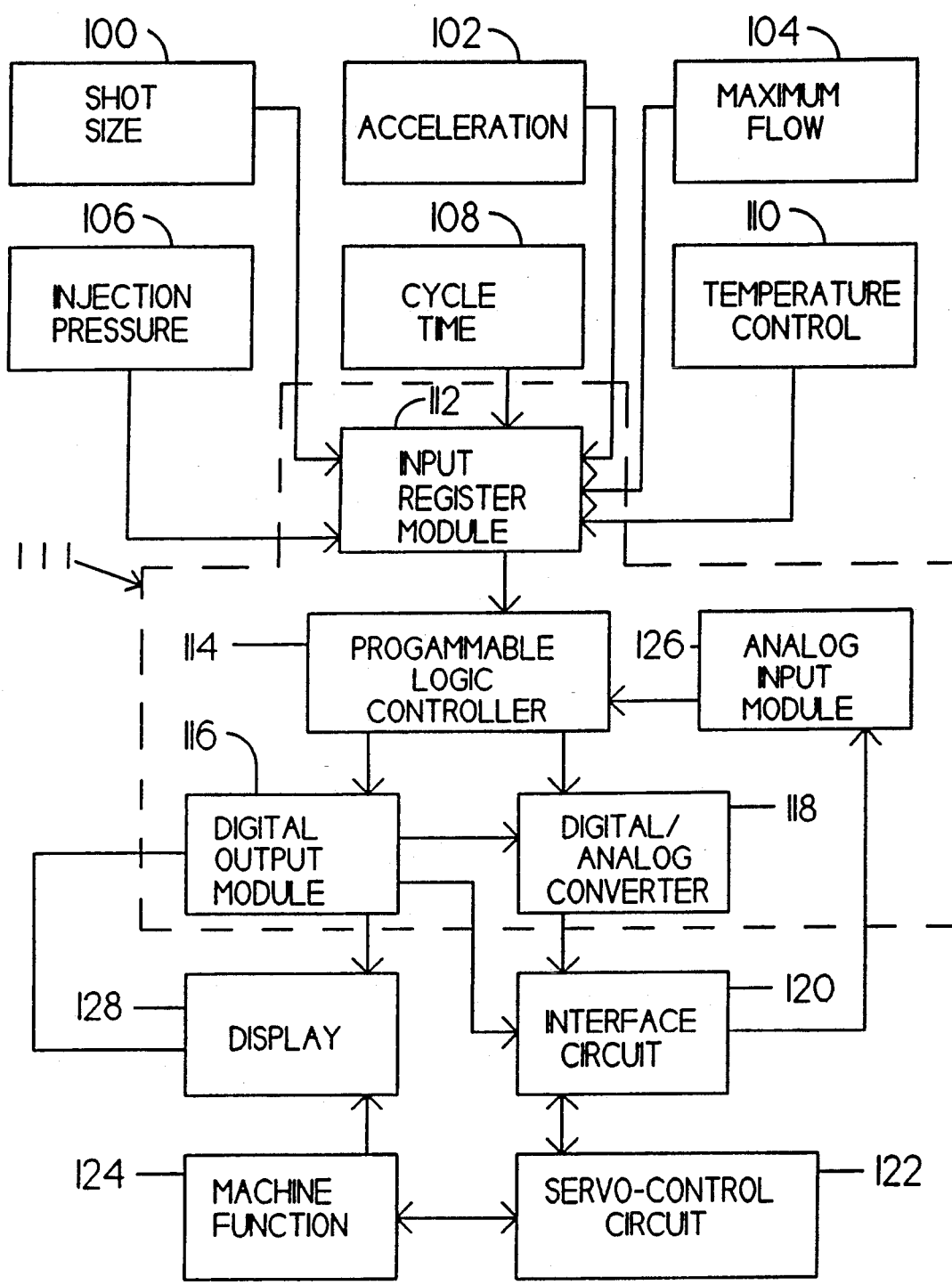
FIG. 3 is a block diagram of the control system of a first preferred embodiment of the injection molding apparatus of the invention.

Turning now to FIG. 3, a simplified block diagram of the improved control system for the injection molding apparatus of the invention is shown. The control system of the invention comprises a computer interface injection control system which greatly simplifies use of the injection molding apparatus and allows a great amount of flexibility to be obtained in the operation thereof. Input variable parameters such as shot size 100, acceleration 102, maximum flow velocity 104, injection pressure 106, cycle time 108, and temperature control 110 show basic parameters which may be effectively controlled by the control system. Although these parameters represent basic parameters which are desired to be precisely controlled in operation of the injection molding apparatus, a variety of other dynamic variable parameters may be similarly controlled by selection of the desired parameters as inputs to the control system. In the preferred form, each of the dynamic variable parameters relating to the function of the injection apparatus may be controlled by selecting input values of these variables for set up of the injection cycle to be performed by the apparatus. A selected shot size value may be manually entered via a key board interfaced either integrally or selectively to an input register module 112. The shot size parameter of an injection cycle relates to a predetermined quantity of liquid molding material which is to be drawn into the injection chamber 18 as seen with respect to FIG. 1. Setting of the shot size parameter for an injection cycle will relate to the particular configuration of the molding die being utilized, and the amount of molding material to be used and filling of the injection chamber 18 can be optimized in a particular injection cycle. Setting of the shot size parameter 100 will in turn control retraction of the injection ram 24 by means of the linear potentiometer 44 as described with reference to FIG. 1. As will be described hereinafter, after the shot size parameter is set for a particular molding die, this parameter may be stored in the control system and automatically downloaded for automatic set up of the injection apparatus for a particular injection cycle to be performed. It should also be understood that inputting of a selected shot size parameter may be performed by an alternative source from a key board such as push buttons, limit switches or the like as desired.

Similarly, the acceleration parameter 102 forming an input to the control system may be manually entered from a key board into the input register module 112 to control acceleration of the injection ram during a particular injection cycle. As will be described in more detail hereinafter, a portion of the control system includes a novel servo-control system wherein the acceleration parameter of the injection ram during an injection cycle is continuously monitored and compared with preselected parameters which represent the desired acceleration parameter so as to continuously control acceleration of the injection ram during the injection cycle. For a particular pattern to be fabricated, the acceleration parameter of the injection ram may be critical to achieve a high quality pattern and preclude pattern imperfections such as air entrapment, surface imperfections, incomplete fill or the like. The acceleration parameter 102 along with flow and pressure are critical to obtain the best results in the injection process.

The injection parameter of maximum flow 104 similarly relates to achieving the proper operation of the injection ram during an injection cycle. In the servo-control system, the maximum flow parameter 104 is repeatedly compared against the continuous monitoring of the injection ram velocity which corresponds to the material flow rate in the injection cycle. The maximum flow rate parameter 104 may be similarly entered from a key board to the input register module or by other suitable means, and once input for a particular molding die may be subsequently downloaded for automatic operation.

The injection pressure parameter 106 will also be precisely and accurately controlled by means of feedback obtained from the pressure transducer 25 as described with reference to FIG. 1. The pressure transducer 25 may be situated directly within the flow of molding material in the injection nozzle of the injection molding apparatus to continuously monitor the back pressure of the wax during the injection cycle which will be compared to the pre-selected injection pressure chosen for a particular injection cycle. The injection pressure parameter 106 may be similarly manually entered from a key board to the input register module 112, and may also be automatically downloaded subsequent to initial set up as previously described. It has also been found that the injection pressure parameter, being particularly critical in the fabrication process, may be desirably displayed, wherein both the selected injection pressure as well as realized injection pressure from the pressure transducer may be displayed for observation by the operator during an injection cycle.

Another parameter which is advantageously selected as an input is the cycle time 108 of the injection cycle. The input parameter of cycle time may again be manually input to input register module 112 via a key board or the like and subsequently downloaded for automatic operation for a particular injection cycle relating to a selected molding die. Again it may be advantageous for the operator of the apparatus to have an indication of the time remaining in an injection cycle to monitor proper operation of the apparatus, and therefore a display of the time remaining may be generated from this input variable. Generally, the cycle time and display of time remaining will be obtained by means of an internal timer within the control system, but may otherwise be generated with reference to a remote timing source or the like.

Another input variable is the temperature control 110, which generally refers to temperature control of a variety of components in the injection molding apparatus. For example, in many instances the temperature of the nozzle tip of the injection apparatus is important to yield proper injection characteristics. Similarly, the temperature of the molding die itself may be important and may be controlled by adjusting the temperature of the upper and lower platens clamped about the molding die. It also should be of noted that the temperature of the molding material in the reservoir tank should be controlled to maintain the molding material in a molten state and at a temperature corresponding to the temperature of the molding die for example. Thus, temperature control of these various aspects of the injection molding apparatus can be affectively accomplished by individual temperature controllers. The temperature controllers may be interfaced with the control system of the invention, wherein the input values set for each of these parameters at 110 will be fed to the controller and continuously monitored.

It should be recognized that the dynamic variable input parameters as described above generally will comprise only a partial number of the parameters which are desirably controlled during an injection cycle. For example, other parameters such as clamp position or velocity control, clamp pressure, injection nozzle height as well as a variety of other variable parameters may be preselected for a particular molding die and pattern to be fabricated so as to ensure speedy and reliable set up of an injection cycle and ensure optimization of the injection cycle for high quality production of injection molded parts such as expendable patterns used in metal casting processes.

The preselected dynamic variable parameters which are input into the input register module 112 are thereafter supplied to a programmable logic controller 114 which is programmed and adapted to provide automatic operation of an injection cycle and a molding process. The PLC 114 of the injection control system enables inputting and monitoring of process control parameters in a user friendly and extremely flexible manner. The process parameters as described above as well as any other process parameters may be initially input into the PLC 114, which has an internal random access memory (RAM) which may be utilized to store a large number of molding die recipes or process parameters within the control system. The die recipes may be identified by any suitable designation, wherein upon any use of a particular molding die, the die recipe may be downloaded from the control system to automatically set up the process parameters for a particular die to greatly reduce set up time and to minimize operator activities with respect to initiating an injection cycle. Thus, once an acceptable wax pattern is produced for a particular molding die, the injection parameters for that particular die would be established and could thereafter be locked into the control system for subsequent use. Any subsequent use would merely require inputting of a tool identification number assigned to a particular molding die to be used, wherein all process parameters and subsequent operation of the injection cycle would occur without operator intervention. The PLC 114 may also have the capability to lock in the process parameters, wherein the operator would not be capable of modifying such parameters to ensure the preservation of product integrity as well as to facilitate diagnostic analysis and trouble shooting of any problems which may arise in the molding process. This system also provides the capability of generating quality control and production control reports relating to use of the injection molding apparatus and enables the user to trace parts made on a particular injection apparatus. The traceability of parts gives the user the ability to determine whether a particular part was made according to desired specifications, which is extremely important with todays stringent tightening of quality control standards, especially in industries such as aircraft and ordinance manufacturing.

It should be recognized that the use of a PLC 114 greatly extends the injection capabilities of the injection molding apparatus as it allows an infinite number of combinations of process control parameters to be easily and effectively implemented. The infinite number of process control parameters which may be implemented essentially removes the limitations of the injection molding apparatus for example in the process of metal casting using an expendable injection molded pattern. In one aspect of the control system of the invention, precise control of the injection process allows various acceleration/deceleration functions to be implemented. For example, five pre-selected acceleration/deceleration functions may be initially set up and subsequently selected by an operator in association with a particular die recipe. The parameters of flow rate and acceleration which are of critical importance in the fabrication of a high quality patterns may be varied within an injection cycle to achieve optimal pattern forming capabilities by allowing both acceleration and deceleration as well as different wax flow rates during a single injection cycle. It should also be understood that any acceleration/deceleration function may be easily and conveniently generated or modified to customize the injection apparatus for a particular use. The use of a PLC 114 also gives the control system a great amount of flexibility as various options may be easily added or subtracted as the PLC 114 has available various input and output communication ports for linking with various other processing devices or otherwise.

In a first preferred embodiment, the PLC 114 is operatively coupled to a digital output module 116 which may generate output signals corresponding to various of the input process parameters, such as cycle time 108 or temperature control variables 110. The PLC 114 may provide digital signals to the temperature controllers as well as the timer circuit of the injection apparatus. Additionally, digital output signals generated from digital output module 116 may be fed through a digital to analog converter 118 to generate analog signals used to set injection process parameters. Additional process parameters may also be supplied from the PLC 114 directly to the D/A converter 118 for setting of the injection parameters for a particular molding die. Output signals from the processing circuit comprising PLC 114, digital output module 116 and the D/A converter 118 are thereafter coupled to an interface circuit 120, which is adapted to interface the PLC 114 and associated processing equipment to a servo-control circuit 122 which controls and implements machine functions 124 and receives feedback for control of various process parameters. The servo-control circuit 122 forms a closed-loop servo-control which provides dynamic feedback of measured process parameters for comparison with the control inputs generated by PLC 114. The difference between the pre-selected input and the measured output may then be used to drive the system toward a dynamic state which reduces any differences to zero, so as to obtain an extremely precise control of acceleration, flow, injection pressure and other parameters. Additionally, as will be described more fully hereinafter, the PLC 114 interfaced with the servo-control circuit 122 via interface circuit 120 allows velocity, pressure and other parameter profiles to be created in the system, wherein any deviation from such profiles may be indicated and used for process control as well as information and data collection. It is also seen in FIG. 3 that feedback control signals from the servo-control circuit 122 are also coupled via interface circuit 120 to analog input module 126, adapted to receive various analog signals from measured process parameters which are converted to digital signals and fed back into PLC 114 for continuous process control and monitoring as well as data collection. Additionally, a variety of machine functions as well as input variables may be displayed on a suitable display device 128 for visual feedback to the machine operator as to the status of an injection cycle, various process parameters and a variety of other information.

As a preferred but non-limiting example, a suitable PLC 114 may be the Square D Sy/Max ® programmable controller Model 401 or alternatively a Honeywell IPC620-11 PLC, but it should be recognized that a wide variety of PLCs may be used in the control system and are contemplated for use in the present invention. In the Square D series 401 PLC, an on board RAM will allow the storage of approximately 300 sets of injection parameters or die recipes which may be recalled to automatically load the machine with the proper injection parameters for a particular die. This type of PLC also includes various input and output ports which allow direct communication with other compatible processors or other devices, such as a class 8030 type ROM122 isolated analog output module or type RIM126 isolated analog-thermocouple input module also manufactured by Square D Company. Such input or output modules may be suitably coupled to the PLC 114 to achieve the desired processing characteristics of the control system of the invention.

Figure 4:
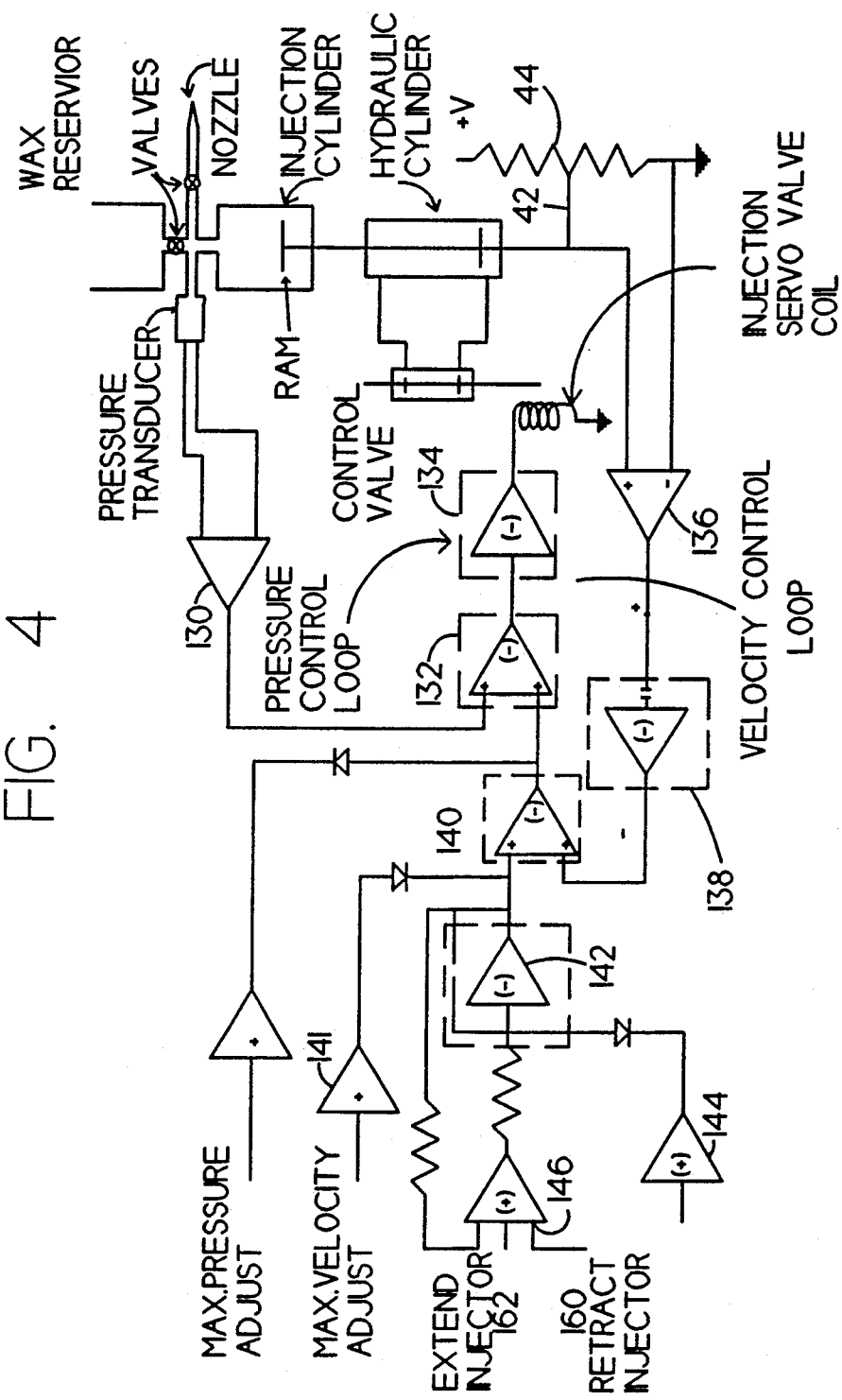
FIG. 4 is a schematic diagram of the servo-control incorporated into the apparatus of the invention.

Turning now to FIG. 4, there is shown a generally schematic circuit diagram of the servo-control circuit used in conjunction with the PLC processing circuitry 111 of the control system in the invention. Many aspects of the servo-control circuit are described in greater detail in the assignee's prior U.S. Pat. No. 4,274,823 which has been incorporated herein by reference, and details of various aspects of the circuit can be referred to therein. The servo-control circuit generally comprises a system specially designed to monitor and variably control certain dynamic operational parameters which are encountered in the injection molding. As mentioned previously, the acceleration, velocity and pressure of the liquid molding material used in the molding process is continuously monitored, and the servo-control system is responsive to these parameters to variably control the magnitudes thereof with a high degree of accuracy through the injection and solidification cycles. The servo-control system compares a desired value of a variable process parameter to the actual value of the parameter and provides an error signal which is used to adjust the apparatus so the actual value of the parameter under surveillance closely approximates the pre-selected and desired value. The servo-control system generally comprises two servo-control loops, one being a pressure control loop and the second being a velocity control loop which will in turn control the acceleration parameter of the injection process. The pressure control loop generally comprises a pressure transducer which is mounted within the injection nozzle so as to be exposed to and responsive to the fluid pressure of the material flow between the injection cylinder and injection nozzle of the apparatus. The output of the pressure transducer is coupled to an operational amplifier 130 which in turn is connected to a comparator 132 which is also supplied with a pre-selected control signal from the control system representative of the maximum pressure. The output of the comparator 132 is then supplied to amplifier 134 which controls the injection servo-valve coil operating the control valve of the hydraulic system and in turn the piston within the hydraulic cylinder and the injection ram. The output signal of the pressure control loop will thus be representative of any differences between the pre-selected maximum pressure and that sensed by the pressure transducer and will control the injection servo-valve to adjust actuation of the injection ram and result in increase or decrease in the fluid pressure as desired.

In the velocity control loop, any movement of the injection ram will result in corresponding movement of the wiper arm 42 of the linear potentiometer 44, and a feedback signal from linear potentiometer 44 will be fed to an instrumentation amplifier 136. The output of the amplifier 136 is proportional to the position of the injection ram and is supplied to a differentiating amplifier circuit 138 which will have an output proportional to the time rate of change of position or the velocity of the injection ram. The output of the amplifier circuit 138 is supplied to an amplifier 140 which acts as a comparator, and which is also supplied a velocity clamping voltage from the control system. The amplifier 140 generally acts as voltage summing amplifier and will compare in the feedback signal from the linear potentiometer indicative of the velocity of the injection ram with a desired reference voltage derived from amplifier 141. The velocity control of the injection ram during an injection cycle enables a high quality casting to be fabricated for a particular part being molded, allows repeatable results with a particular mold die and ensures integrity of the molding process.

It should also be understood that the acceleration of the injection ram will be defined by the rate of change of its velocity with respect to time, and control of the acceleration will also enable high quality and repeatable molding of a desired pattern to be achieved. The control system of the invention is adapted to generate an acceleration/deceleration function for an injection cycle, wherein the acceleration function will be applied to the servo-control circuit as a voltage waveform via amplifier 144. An integrating amplifier 142 is supplied with a voltage in conjunction with an output voltage of amplifier 146 to generate the proper acceleration signal which is thereafter applied to comparator 140 to be compared with actual movement of the injection ram. Any deviation from the desired acceleration or deceleration characteristics of the injection ram will then be supplied as a voltage waveform to invertor amplifier stage 143 and current amplifier 134 to the injection servo-valve coil. An output signal representative of the proper acceleration or deceleration desired will be supplied as a sufficient current which is made to flow through the coil to actuate the spool valve within the control valve of the hydraulic system to cause movement of the injection ram in a desired manner.

The control system of the invention including the PLC processing, generates control signals which are supplied to the servo-control circuit. Process control signals developed by the PLC and associated peripheral processing devices have eliminated the need for adjustment potentiometer for the process control variables which were initially set by the operator in the prior injection molding apparatus. Elimination of the control potentiometer has resulted in elimination of any possible misadjustment of such potentiometer and again reduces setup time and initiation of an injection cycle. Additionally, the ability of locking out the inputs to the PLC in the control system also enable process parameters to be set and secured without allowing an operator to modify or vary the process parameters as desired. The control system of the invention has also eliminated the need for the logic control system and its associated CMOS devices and FET switches as part of the control system described in U.S. Pat. No. 4,274,823, which were not isolated and created significant noise within the control system. The control system utilizing the PLC also increases the current capacity of output relays associated with the control system.

Figure 5:
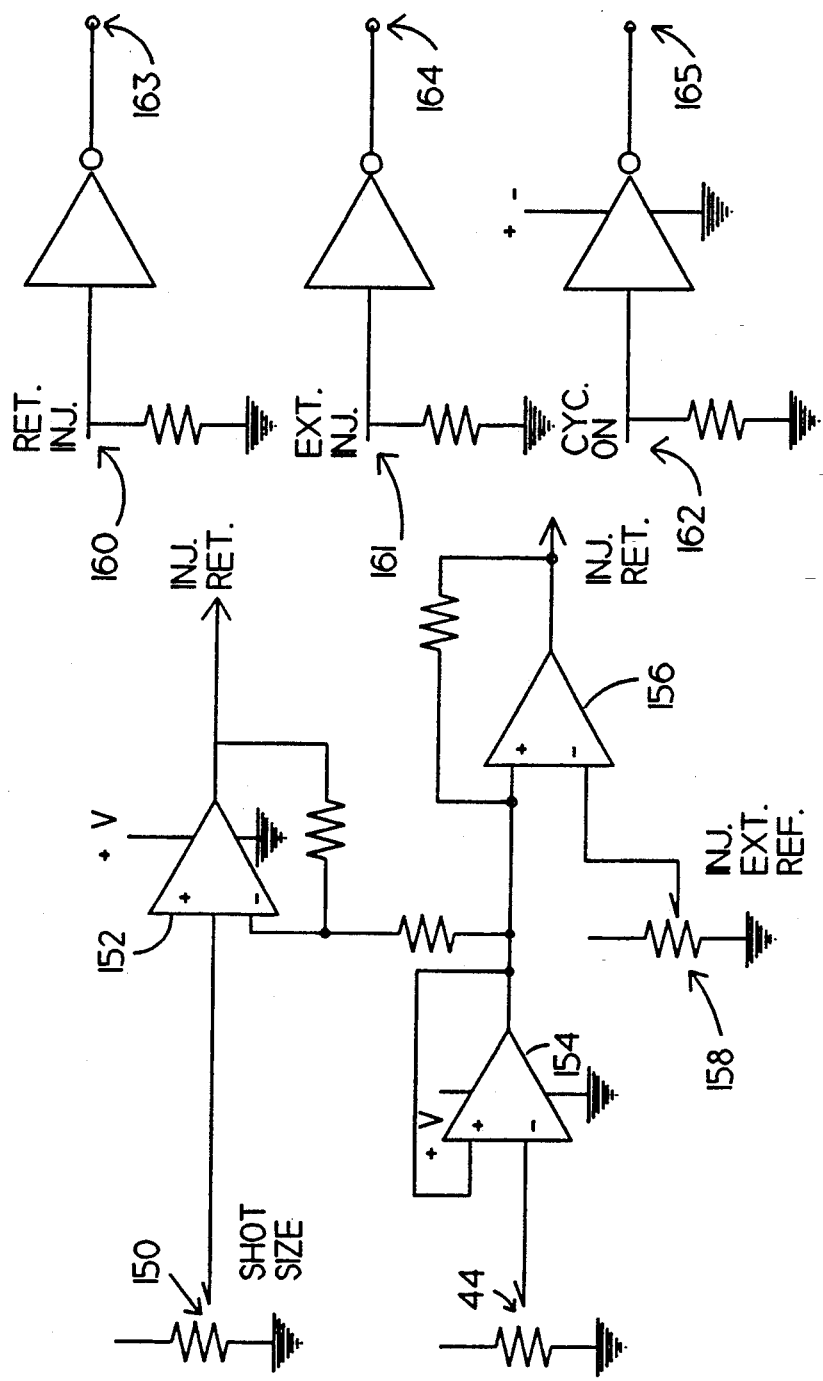
FIG. 5 is a schematic diagram of the interface circuit between a PLC and the servo-control circuit as seen in FIG. 4.

Turning now to FIG. 5, there is shown the interface circuit adapted to couple the PLC processing system to the servo-control circuit. The interface circuit generally comprises an edge connector adapted to connect to each connector of the servo-control circuit as well as a buffer circuit and comparator circuit which allows use of the servo-control circuit with the PLC. As seen in FIG. 5, the interface circuit may include a potentiometer 150 controlled by a user adjustable knob on a front panel of the injection molding apparatus, which has an output thereof coupled to amplifier 152. The linear potentiometer 44 associated with the injection piston also has an output thereof coupled to the buffer amplifier 154, wherein an output signal proportional to movement of the injection ram will then be supplied to an input of amplifier 152 for comparison with the selected shot size process control signal selected by the operator or download from a die recipe. The output of amplifier 152 may be termed an injector retracting signal which is coupled to the PLC in the control system. The output of amplifier 154, indicative of the position of the injection ram, is also supplied to a comparator circuit 156, which is also supplied with an injector extending reference signal from a reference potentiometer 158. The reference potentiometer 158 allows the control system to be zeroed relative to full extension of the injection piston and injection ram for a particular injection molding machine, to ensure that all subsequent indications of ram position, velocity and acceleration are accurate. The output of the comparator circuit 156 is also supplied to the PLC as an injector extended signal. The edge connector of the interface circuit comprises a plurality of coupling sites from the PLC, which as shown in FIG. 5 include retract injector 160, extend injector 162 and cycle on 164 communication ports. Each of the PLC communication ports 160, 162 and 164 are coupled via buffer amplifiers to servo-control circuit communication ports 163, 164 and 165 respectively. The servo-control circuit coupling sites for the retract injector and extend injector process control signals are indicated on FIG. 4, and other similar coupling sites are provided for each of the process control parameters to be controlled by the control system and actuated by the servo-control circuit.

Figure 6:
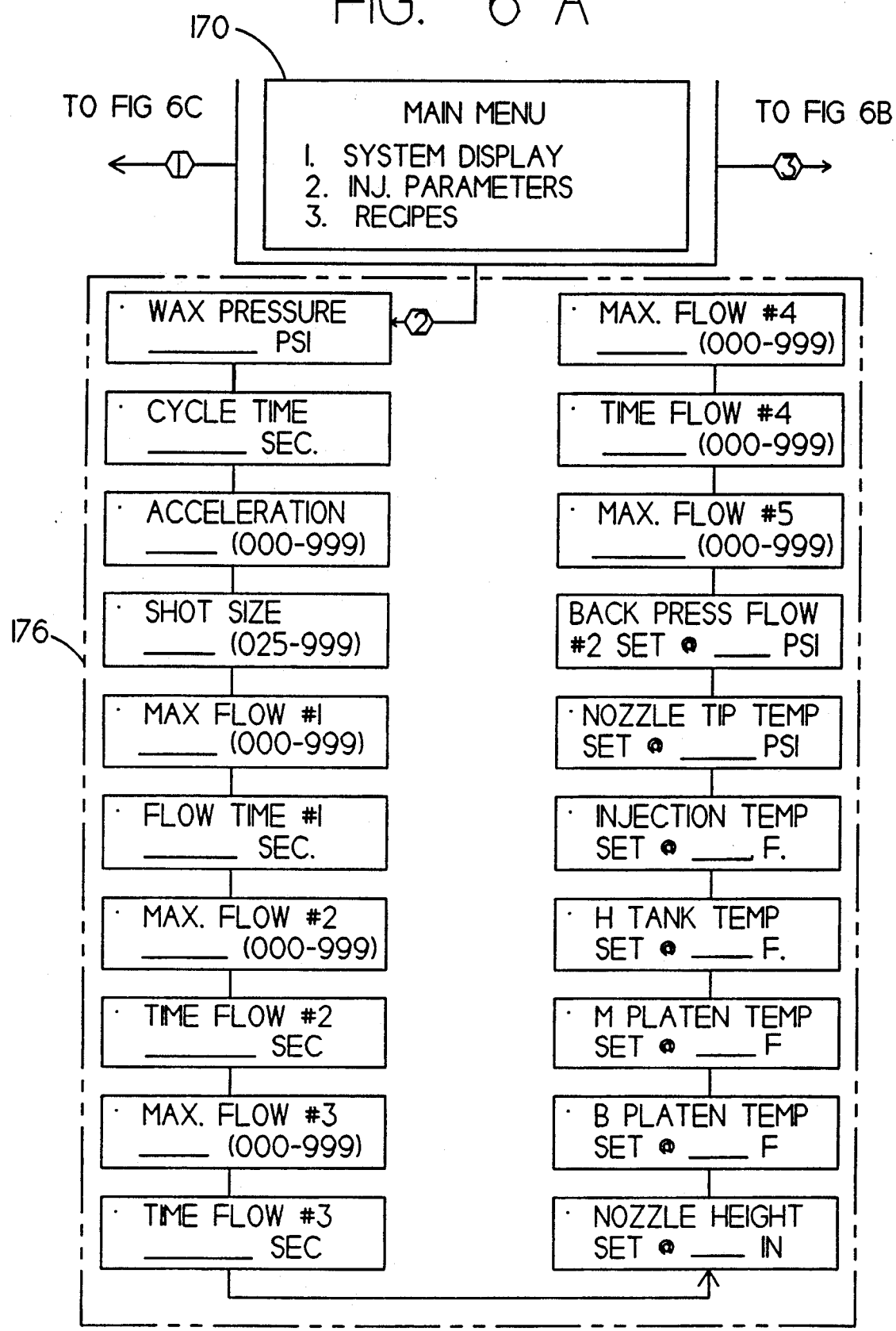
FIGS. 6a–6c show a flow chart indicating functioning of the control system in various aspects set up and implementation of the injection process for a preferred embodiment.
Figure 6:
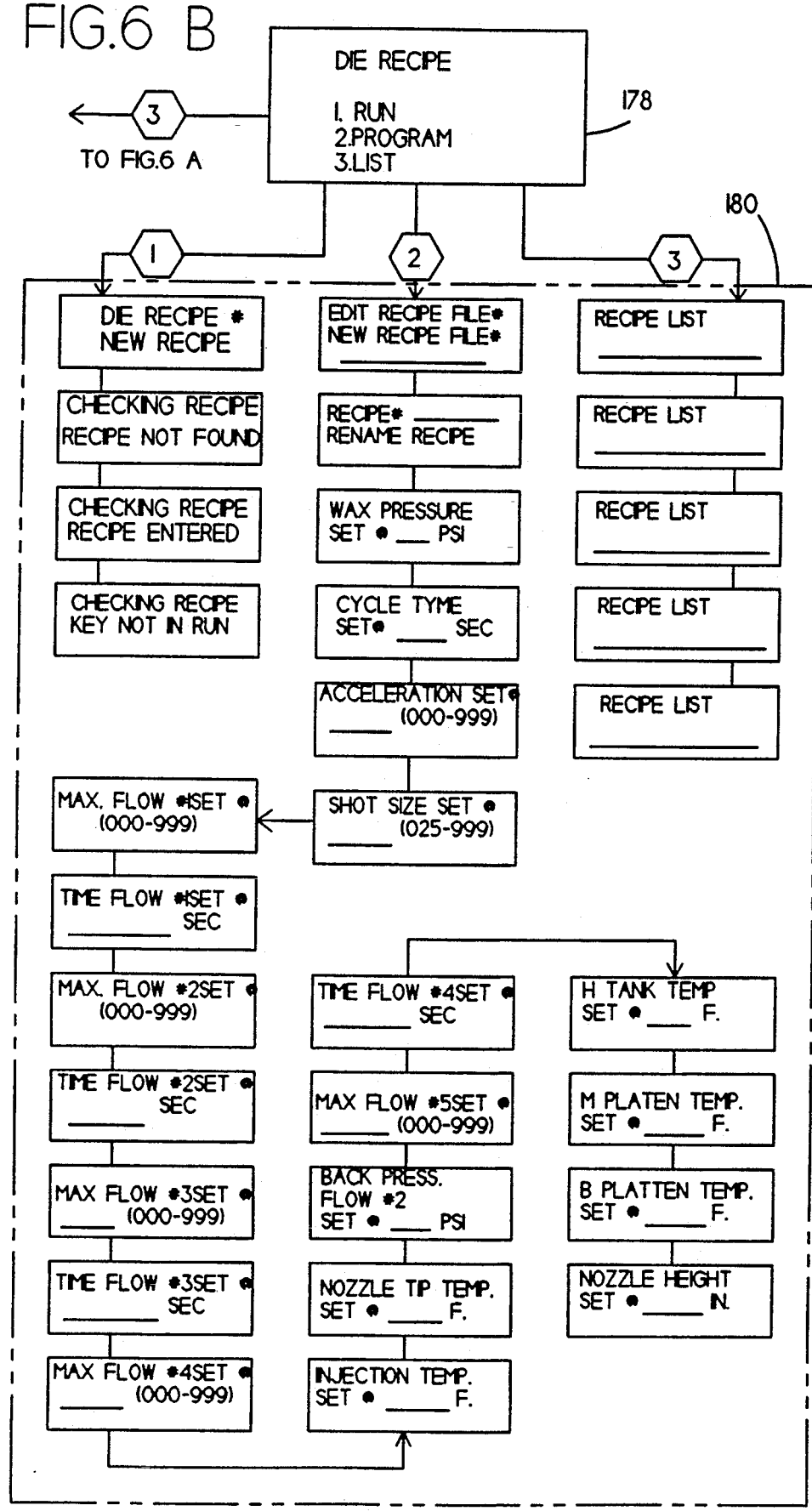
Figure 6C:
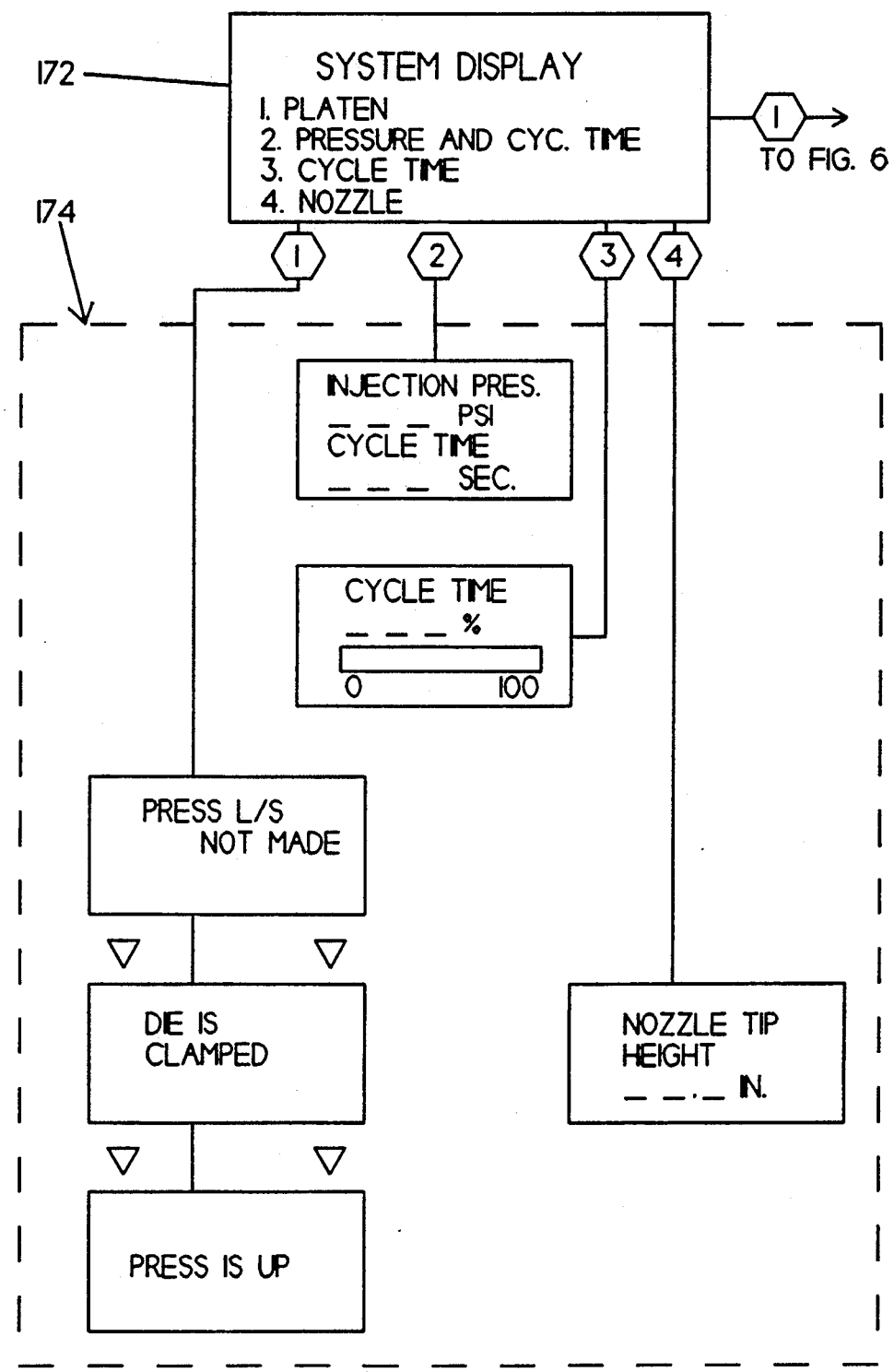

Turning now to FIG. 6, there is shown a flow chart indicating set up and functioning of the control system in various aspects of the injection process. In the control system, the PLC 114 as described with reference to FIG. 3 essentially comprises a two fold system having a run mode and a program mode associated with a particular molding die, a die recipe is prepared in accordance with the process control parameters which are found to produce high quality patterns when using a particular die. The PLC is initially placed in program mode, wherein a keyboard may be coupled to a communication port of the PLC for input of the various process control parameters for a particular die. The PLC may be programmed to provide menu driven programming of a die recipe into the PLC. As seen in FIG. 6a, a main menu is generated from the control system and PLC 114 as indicated at 170, wherein various alternatives of system display, injection parameters or die recipes programmed or to be programmed can be displayed. In the system display option as seen in FIG. 6c at 172, various process parameters of an injection cycle will be displayed on a video display terminal (VDT), digital display or other suitable display device. Various functions of the injection molding apparatus and the status of these functions may be displayed as indicated at 174, such as whether the upper platen of the apparatus is clamped onto a molding die for which an injection cycle to be performed, whether the press is up or various other status conditions of the apparatus. The operator may also select an option to display the selected injection pressure and/or cycle time of an injection cycle for a particular die recipe down loaded for operation. The time remaining in an injection cycle may also be displayed to give the operator an indication of the time remaining in an injection cycle. Various other parameters, such as nozzle tip height or other status conditions, may also be displayed for a particular molding die used.

Alternatively, the operator may select a display of the injection parameters as indicated in FIG. 6a at 176, wherein parameters such as wax pressure, cycle time, acceleration, shot size, the acceleration/deceleration function to be implemented including the flow rates and times or pressures at which they are initiated, back pressure, temperature settings of various portions of the apparatus and nozzle tip heights. If an operator who is knowledgeable with respect to the injection process is implementing an injection cycle, the control system may be switched into a run-edit mode wherein the operator can modify any of the process parameters which are deemed necessary. For example, if various external factors are found to affect the temperature control settings of various portions of the apparatus, the operator may adjust the temperature settings to compensate for the external factors. Alternatively, the control system may be switched into a run-only mode, wherein the process parameters may not be modified by the operator. This feature essentially allows the operator to be taken out of the pattern fabrication operation to ensure consistency and increase overall control of the injection process. Thus, the operator does not necessarily need to be particularly competent with respect to setting up and operating the injection molding apparatus to achieve high quality patterns and the injection molding process may be performed more cost effectively and efficiently. As all functions of the injection molding apparatus are effectively controlled by the control system, operation of the apparatus can be carried out essentially automatically.

To enable automatic operation of the apparatus, a large number of die recipes may be programmed into and stored within the control system. As indicated in FIG. 6b at 178, the operator may select the die recipe option from the main menu 170, wherein a programmed die recipe may be run, a new recipe may be created or an existing recipe may be listed. As indicated at 180, initiation of an injection cycle using a programmed die recipe may be selected by indicating the die recipe to be used, wherein the control system will download the selected recipe or indicate that such a recipe does not exist. Alternatively, a process engineer or knowledgeable operator may program in a new die recipe or edit an existing recipe, wherein each of the process parameters will be displayed if existing, and editing thereof can be performed, or a new recipe may be created. As another option, any die recipe may be listed, whereby the process parameters may be viewed accordingly. It is also contemplated that a particular die recipe may be selected by means of a bar-code designation which may be attached to a particular die, and simply read by a bar-code reader associated with the injection machine and downloaded for operation.

Figure 7:
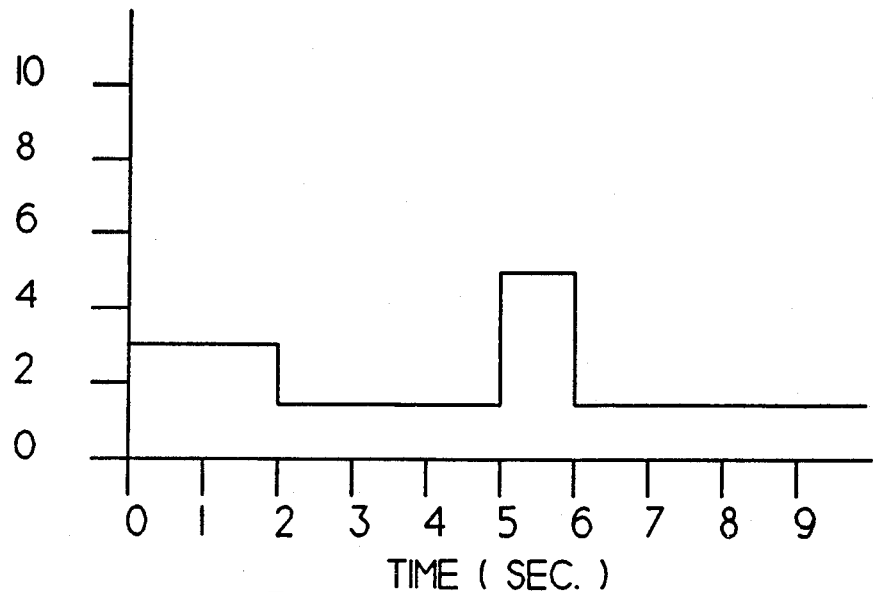
FIG. 7 shows a graph indicating an example of an acceleration/deceleration function which may be implemented by the control system, wherein acceleration/deceleration is based upon time during an injection cycle.

In another aspect of the invention, an acceleration/deceleration function may be implemented to closely control flow within an injection cycle to optimize fabrication of an expendable pattern. The control system may be programmed to carry out a particular acceleration function which may also be displayed on the display device of the control system, wherein an example of such an acceleration function is shown in FIG. 7. As seen therein, the acceleration function may comprise a series of different flow rates which will cause acceleration and deceleration of the injected wax flow to form a high quality pattern for a particular injection die. As merely an example, the function shown in FIG. 7 indicates an acceleration flow rate of 3 in.$^3$/sec. for two seconds, in which the actual flow of wax will accelerate to this rate until two seconds have elapsed and thereafter, the control system is adapted to decelerate the flow to a rate of approximately 1.5 in.$^3$/sec. for three seconds after the initial flow rate. The flow rate may again be accelerated in the time period from five to six seconds to a flow rate of approximately 4.5 in.$^3$/sec. Thereafter, the flow rate may be decelerated as the die cavity is becoming increasingly filled to a rate of approximately 1.5 in.$^3$/sec., until complete fill is achieved. It should be apparent that the control system of the invention allows an infinite number of acceleration/deceleration functions to be controlled with respect to time in a precise manner to achieve acceleration and deceleration characteristics in the injection cycle which will optimize high quality fabrication. As previously mentioned with respect to the control system, the programming of the PLC may be implemented to allow five preset flow rates to be entered for a particular die recipe. These five preset flow rates are initiated at pre-selected times during an injection cycle, although any number of flow rates may be selected to generate a particular acceleration function for a particular die recipe as desired.

Turning to FIGS. 8a and 8b, volume and pressure profiles for the acceleration function as described in FIG. 7 are shown. In FIG. 8a, the actual flow of injected wax into a die during an injection cycle is shown, wherein at initial stages of the injection cycle, the injection nozzle is retracted as indicated at 200 and an amount of molding material in accordance with the selected shot size is introduced into the injection chamber of the apparatus as previously described. After the injection chamber is filled with the desired shot size, the injection nozzle is extended over a period of time as indicated by T, and thereafter injection of the material into the mold cavity from the chamber is accomplished by the injection ram. The pre-selected first accelerating flow rate as indicated in FIG. 7 is then implemented by the injection apparatus as indicated at 202 for a period of two seconds. Thereafter the second flow rate as indicated at 204 is initiated, wherein the reduced or decelerating flow rate over the next three second period is indicated by a flattening of the curve in FIG. 8a. The third flow rate is then initiated for a period of one second, with the increased or decelerating flow rate indicated by a steepening of the curve at 206, and thereafter, the fourth and final decelerating flow rate is initiated until the die cavity is completely filled as indicated at 208. With reference to FIG. 8b, the pressure profile of the material flowing through the injection nozzle is shown, wherein back pressure as sensed by the pressure transducer located adjacent the injection nozzle only senses a pressure upon initiation of the injection into the mold cavity. An initial pressure rise at 210 is seen to correspond with the initial flow rate as indicated at 202 in FIG. 8a. A reduction in pressure is seen to occur at 212 upon initiation of the decelerating second flow rate 204 as indicated in the flow profile of FIG. 8a, and similarly, a pressure rise at 214 corresponds to the third accelerating flow rate at 206. The final decelerating flow rate at 208 is indicated by the pressure drop at 216 in FIG. 8b which continues until the die cavity is completely filled. The flexibility of performing any desired acceleration function in the injection cycle allows much better control over the injection process and significantly reduces mold imperfections such as air bubbles, flow lines, cracking or fracturing, incomplete fill, cavitation and the like.

As an alternative to the acceleration/deceleration function as described with reference to FIG. 7, the ramping function may also be set up and performed relative to back pressure sensed by the pressure transducer in the injection molding apparatus. It has been found that implementing an acceleration function based upon time during an injection cycle may not fully account for actual circumstances occurring during an injection cycle. For example, if the die cavity fills more quickly than expected, an acceleration function based upon time of an injection cycle may not be adequately controlling the injection process parameters to achieve the best results for a particular die. For example, it has been found that as the die cavity fills with the injected wax material, various venting orifices in the die structure will become closed as the level of wax within the cavity rises. As the injection cycle continues, the reduction in venting of the die cavity effectively results in higher back pressures which can be sensed with the pressure transducer provided in the injection apparatus. When the die cavity is nearly completely filled, it is very important to maintain the flow of wax into the cavity at a rate to maintain sufficient pressure upon the material within the die cavity and to eliminate problems of cavitation, cracking or surface imperfections which would make the mold formed unusable. Upon monitoring the back pressure in an injection cycle, it has been found that each particular die has a critical point after which flow of material into the die cavity must be very closely and accurately controlled to result in the desired product quality in the formed mold. As the pressure transducer in the apparatus will provide a feedback signal representative of the injection process in real time, use of this information to develop and initiate an acceleration function may provide a more accurate means by which a desired function may be implemented.

Figure 9:
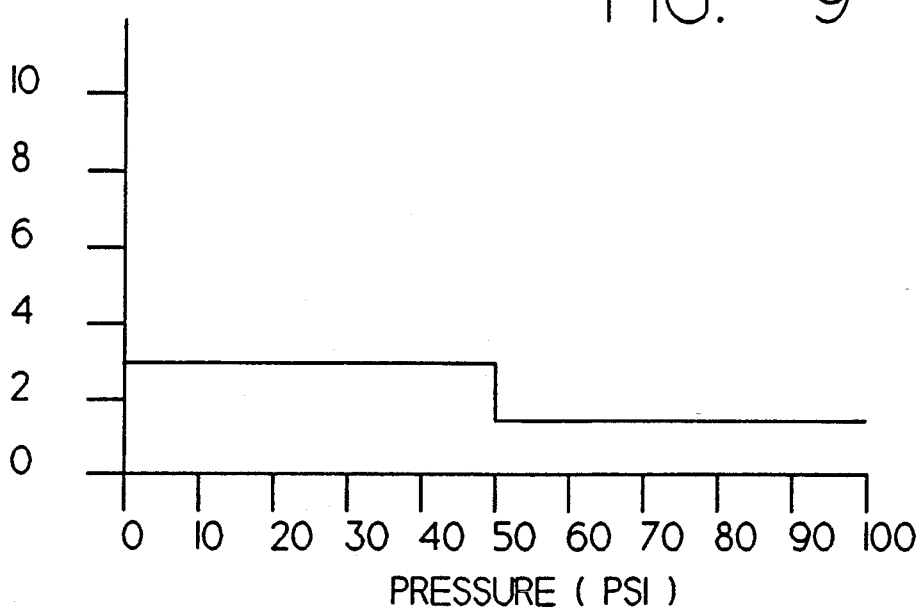
FIG. 9 shows a graph indicating an example of an acceleration/deceleration function which may be implemented by the control system, wherein acceleration/deceleration is based upon sensed back pressures during an injection cycle.

As seen in FIG. 9, the acceleration/deceleration profile may be based upon the actual back pressure measured by the pressure transducer wherein the flow rate of the molding material is modified according to the pressure detected. For example, an injection cycle may be initiated wherein a molding die is injected at approximately 3 in.$^3$/sec., with the injection cycle being modified according to at least one sensed pressure. For example, the injection profile may reduce the flow rate to approximately 1.5 in.$^3$/sec. upon reaching a back pressure of 50 psi. The deceleration performed at the critical point in the injection cycle will facilitate the reduction of various defects and increase the quality of the mold forms produced. For any particular molding die, it will be known what the maximum pressure is desired to be, and thus the acceleration/deceleration function may be implemented based upon actual pressure readings from the pressure transducer as the pressure nears the maximum.

For the example shown in FIG. 9, the actual flow and pressure profiles for this acceleration function are shown in FIGS. 10a and 10b. In FIG. 10a, the flow profile indicates retraction of the injector in filling of the injection chamber at 220 wherein the amount of filling of the chamber equals the shot size selected for the particular die cavity being used. The injection nozzle is then extended during period T and an accelerating flow which, as indicated in FIG. 9 of this example, is approximately 3 in.$^3$/sec. is initiated at 222. Corresponding to the flow profile is the pressure profile of FIG. 10$b$, wherein it is seen that an initial rise in back pressure at 226 occurs upon the accelerating flow of material into the die cavity corresponding to the first flow rate 222. Upon reaching the pre-selected back pressure of 50 psi in this example, which is shown at 228 in FIG. 10$b$, the second decelerating flow rate is initiated as indicated at 224 in FIG. 10$a$ causing a deceleration in the injection profile. This deceleration causes a reduced back pressure to be sensed as indicated at 230, and upon continued filling of the die cavity, the sensed back pressure will slowly rise until the die is completely filled at 232 and the maximum pressure selected is imposed for a solidification cycle. The pressure encountered during an injection cycle is indicative of the filling process, and the ability to judge when the die is almost filled by means of a pressure feedback signal will allow precise and accurate control of the injection process by means of an appropriately tailored acceleration/deceleration function based upon detected pressures. It again should be recognized that the particular acceleration function as shown in FIGS. 9 and 10 is merely an example, and a plurality of acceleration functions based upon pressure may be easily provided by the control system of the invention.

It should also be recognized from the foregoing that an acceleration/deceleration function or profile for a particular injection cycle may be implemented as based both on time and pressure variables. For example, at initial stages of an injection cycle, various accelerating or decelerating flow rates may be implemented at particular times until a selected pressure is encountered in the injection process. Upon reaching a selected pressure, a decelerating (or accelerating) flow rate may be implemented such that advantageous characteristics of both methods of controlling the injection cycle may be relied upon to optimize the injection process.

Figure 11A:
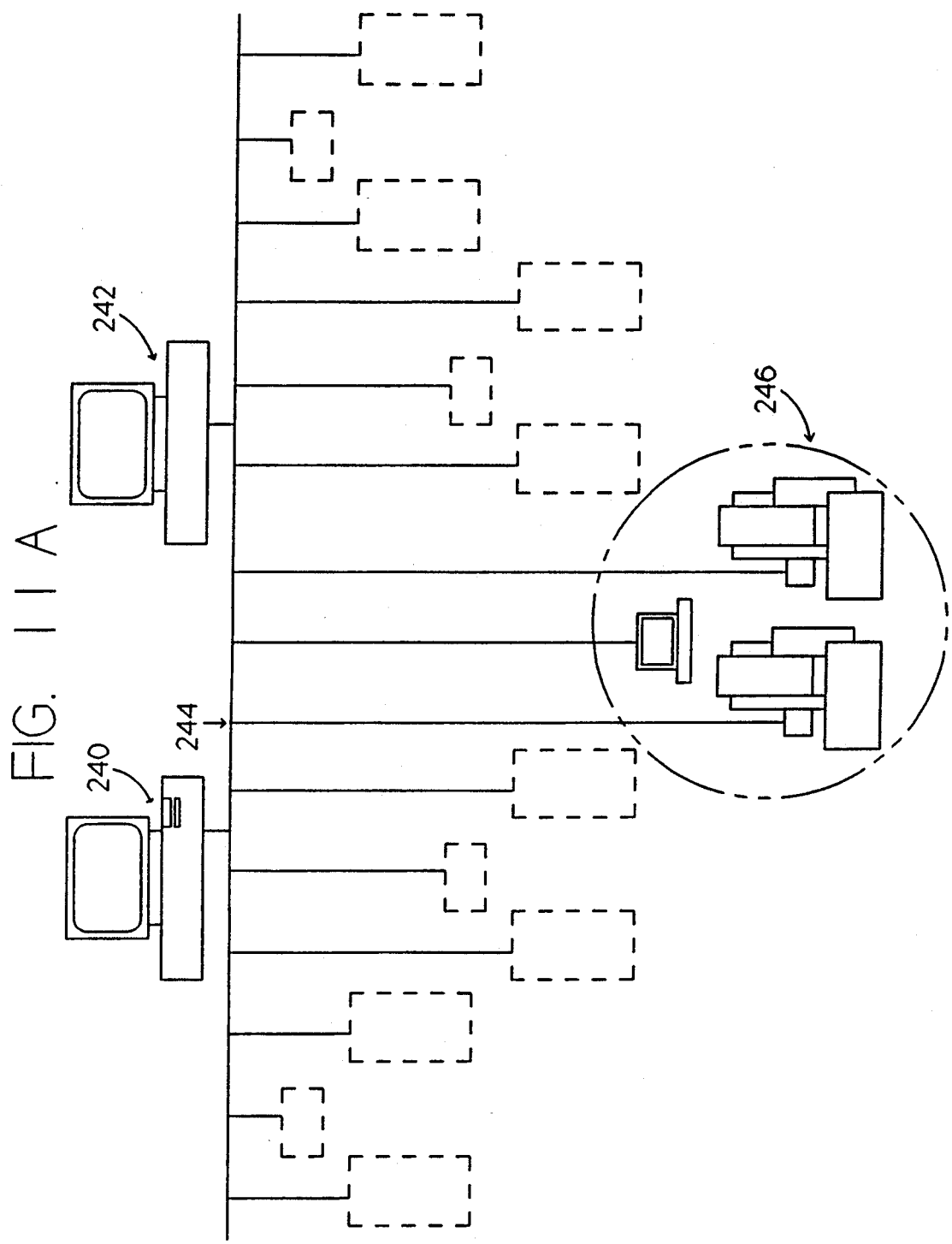
FIGS. 11a and 11b show a generally schematic diagram of an alternate embodiment of the invention showing networking of a plurality of injection molding apparatus in accordance with the invention.
Figure 11B:
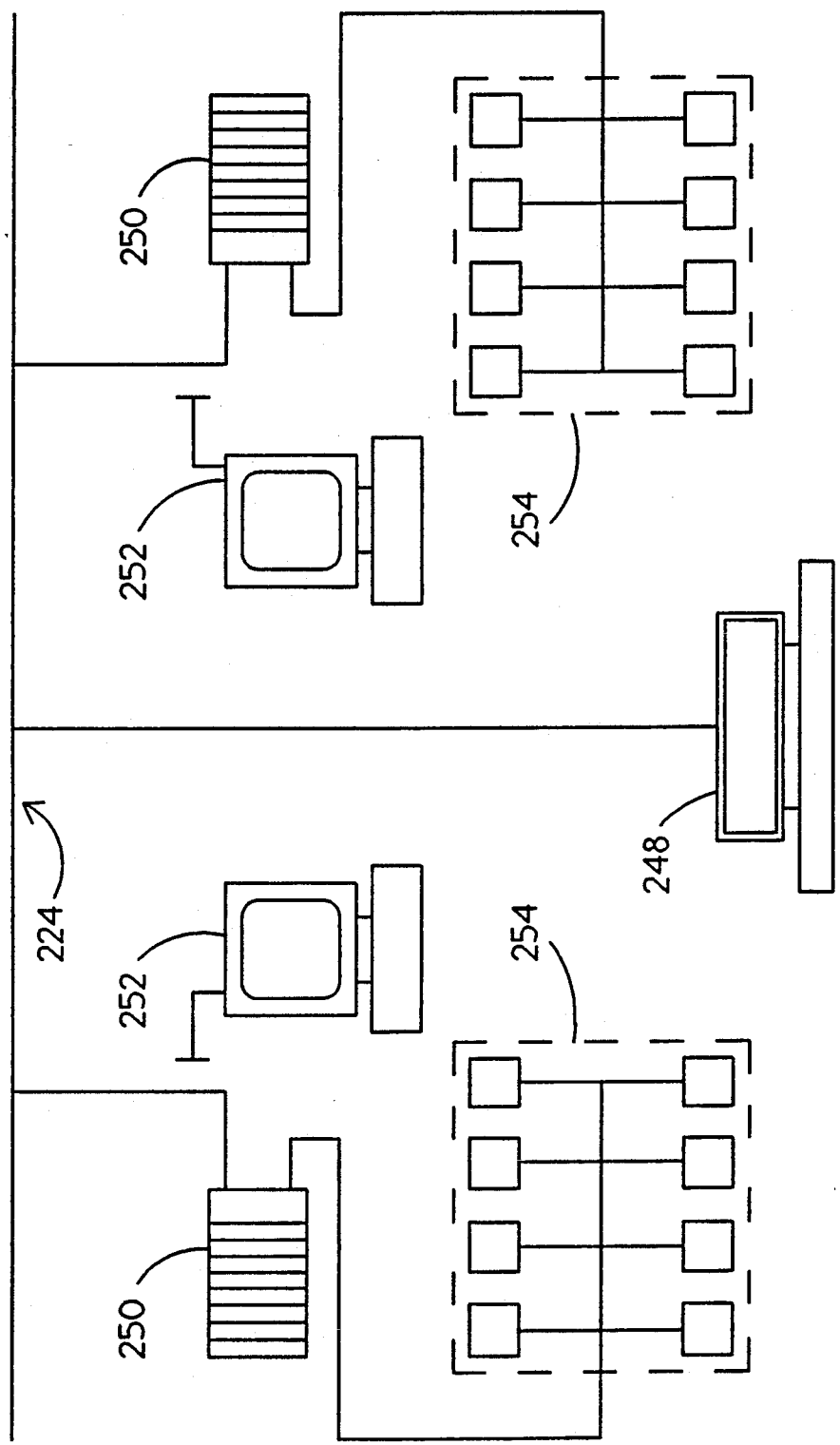

Turning now to FIG. 11$a$, an alternate embodiment of the invention is shown, wherein a plurality of injection molding machines may be networked together and operated from a central control facility to achieve distinct and extremely advantageous capabilities. The control system of the invention including a PLC, has the capability of being networked with a central control facility as indicated at 240 and 242. The central control facility may simply comprise a host computer, which need be no more than a standard personal computer, such as a 386SX, having a sufficient amount of memory to handle the number of injection machines on a particular network. The host computer may be coupled to the injection molding machines by means of a local area network (LAN) as indicated at 244, which is adapted to communicate with the PLC of the control system for each individual molding apparatus. For example, the Square D Company Sy/Max ® Class 8020 type SPC-401 PLC may be networked using the Square D Sy/-Net ® LAN utilizing a network interface module (NIM) as an example. The LAN is adapted to allow communication from the host computer to a work cell indicated at 246, which may typically comprise 8 PLCs and associated control systems. As seen in FIG. 11$b$, a work cell coupled to the LAN, may comprise an operator interface control station 248, which for example may be a Sy/View ® industrial color work station with a key pad produced by the Square D Company. The operator interface provides a display for the operator on which system parameters and function of the injection molding machine may be viewed. A plurality of PLCs including input/output registers are shown at 250 and are coupled to the LAN 244, and forming part of the control system for an injection molding machine. The individual PLCs may be programmed or edited via a programmable controller operator interface module 252 which may be selectively coupled to the PLCs as necessary. The PLCs may in turn be coupled to a plurality of temperature controllers indicated at 254 for control of the temperature of various components of the injection molding machines as previously described.

The networking of a plurality of injection molding apparatus to a central control facility allows a variety of distinct advantages to be gained. Injection parameters, as well as product analysis may be removed from the operator station and placed in control of the process engineer at the central control facility so as to ensure process integrity, security and consistency. As previously mentioned, the security of the injection process is extremely important to eliminate operator error and reduce the necessity for a knowledgeable operator. At the central control facility, a particular injection molding machine may be selected, and all process parameters of that machine displayed, with the ability to modify or edit any existing parameters or generate new die recipes as previously described. Each injection molding apparatus may therefore be set up from the central station and monitoring of an injection cycle may be performed from the central station. In either the stand alone or network embodiments of the invention, the control system of the injection molding machine(s) may be set up so as to generate alarms upon the occurrence of deviations from the preset injection parameters to allow continuous monitoring of the injection processes on each machine and appropriate modification if necessary. As previously mentioned, once an acceptable die recipe is generated for a particular molding die, each of the process parameters may be provided with tolerance bands about the optimum desired parameters, wherein deviation from the pre-selected values beyond a given tolerance band will result in an alarm being triggered. The networking of a large number of injection molding machines also allows greatly enhanced data collection as the central control facility may be provided with suitable storage facilities such that every injection profile from a single machine could be monitored over time for quality control and production control activities. Various management reports may then be generated such as production rates, costs, scrap generation, product flow data as well as a variety of other reporting capabilities which will greatly enhance the user's ability to efficiently and cost effectively produce high quality expendable patterns, and document traceability of product fabrication historically and comparatively. As previously mentioned the ability to trace the manufacturing history of a particular molded product is becoming increasingly important under more stringent quality control standards, and also gives the user the ability to monitor the fabrication process over time.

It should be evident from the foregoing, that the injection molding apparatus and control system of the invention provides a novel and significant improvement relating to injection molding apparatus for use in producing expendable patterns for metal casting techniques. The control system of the invention greatly reduces set up time, and increases the ability to generate and collect technical and accounting data to allow improved cost performance and process control capabilities. The control system provides security to ensure the consistency and integrity of the production process and reduces maintenance requirements by allowing diagnostic analysis of the machine operation on a continuous basis. Although the invention has been described relative to particular preferred embodiments thereof, it should be apparent that various modifications or variations in the apparatus or details of operation are contemplated herein and would occur to those skilled in the art. The invention is therefore not to be limited by the details of the description of the preferred embodiments, but rather is intended to encompass all such modifications which are within the spirit and scope of the invention as defined by the appended claims.

What is claimed is:

1. A process for molding patterns or parts from a fluid molding material using an injection molding apparatus having a source of fluid molding material and an injection ram acting to force said fluid molding material into a molding die under pressure, and a control means for initiating and controlling an injection cycle of said injection molding apparatus, comprising the steps of:
   1) storing a die recipe in at least one memory means associated with a programmable logic controller forming a part of said control means, said die recipe defining an injection cycle for a particular molding die to be used in the injection molding process, wherein said die recipe includes predetermined values of variable process parameters of said injection cycle,
   2) selecting a die recipe corresponding to a particular molding die from said memory means, wherein said die recipe is downloaded into said control means with said predetermined values of said variable process parameters being utilized by said programmable logic controller to generate control signals representative of desired values of said variable process parameters,
   3) initiating an injection cycle wherein operation signals indicative of the actual values of said variable process parameters will be supplied to said control means, and
   4) controlling said injection cycle by regulating the injection of said fluid molding material with said operation signals being driven toward equilibrium with said control signals such that said variable process parameters of said injection cycle simulate the predetermined values of said die recipe.

2. An injection molding apparatus, comprising a source of a fluid molding material and a molding die into which said fluid molding material is forced under pressure by means of a moveable ram during an injection cycle, control means for initiating, monitoring and controlling said injection cycle, said control means comprising a programmable logic controller, PLC, having memory means for storing selected values of a plurality of variable physical parameters associated with said injection cycle, said PLC generating control signals corresponding to said selected values of said variable physical parameters, said control means also including a servo-control circuit operating to control said variable physical parameters of said injection cycle and being coupled to said PLC by means of an interface circuit, wherein said servo-control circuit is supplied with operation signals corresponding to said variable physical parameters during said injection cycle and wherein said servo-control circuit receives at least in part said control signals generated from said PLC and to supply said operation signals to said PLC by means of said interface circuit, said servo-control circuit operating to continuously monitor and control said variable physical parameters during said injection cycle by means of said servo-control circuit which drives said operation signals toward equilibrium with said control signals to regulate the injection of said fluid molding material into said molding die.

3. The injection molding apparatus of claim 2, wherein,
said PLC has associated therewith an input module which allows values of said variable physical parameters of an injection cycle to be programmed into said PLC to develop said control signals, said values of said variable physical parameters generating a die recipe for a particular molding die used in said injection molding apparatus, such that said values of the variable parameters may be implemented automatically at a subsequent time for said particular molding die.

4. The injection molding apparatus of claim 2, wherein,
said control signals generated from said PLC are digital output signals which are supplied to a digital to analog converter such that analog signals are supplied to said interface circuit means.

5. The injection molding apparatus of claim 2, wherein,
said control means is coupled to a display means, to allow continuous visual monitoring of said control signals, said operation signals and the status of said variable physical parameters during said injection cycle.

6. The injection molding apparatus of claim 2, wherein,
said control signals from said PLC are supplied directly to machine function controlling means regulating at least one of said variable physical parameters to effect direct control of machine function for said at least one variable parameter.

7. The injection molding apparatus of claim 2, wherein,
said operation signals are supplied to said PLC from said servo-control to allow information relating to said operation signals indicative of variable parameters of the injection cycle to be used in quality and production control operations.

8. The injection molding apparatus of claim 7, wherein,
said quality and production control operations include visual monitoring of the variable parameters of an injection cycle on a display means.

9. The injection apparatus of claim 7, wherein,
said PLC is programmed to generate a pre-defined injection profile for at least one of said variable physical parameters, said injection profile including a tolerance band about the desired profile, wherein upon deviation of said variable parameter outside of said tolerance band of said pre-defined injection profile during an injection cycle, an alarm will be triggered to indicate such deviation.

10. The injection molding apparatus of claim 7, wherein, said quality and production control operations include the generation of reports based upon accumulated information of the operation of said molding apparatus during multiple injection cycles to indicate function of the apparatus over time.

11. The injection molding apparatus of claim 2, wherein,
said PLC is supplied with values of said variable physical parameters of the injection cycle for a particular molding die used with the injection molding apparatus to create a die recipe for said molding die, wherein after creating said die recipe, said PLC is adapted to be switched to a run-only mode such that said variable parameters of said die recipe cannot be modified by unauthorized individuals.

12. The injection molding apparatus of claim 2, wherein,
said PLC has a program mode, edit mode and run mode, wherein input values of said variable physical parameters are programmed into said PLC in said program mode and implementation of an injection cycle is performed during said run mode, and during said edit mode, the operator of said apparatus may adjust said pre-selected values of said variable parameters during an injection cycle.

13. The injection molding apparatus of claim 2, wherein,
said regulation of the injection of said fluid molding material includes controlling the movement of said movable ram during said injection cycle to control injection pressure, flow rate and acceleration or deceleration of the fluid molding material during said injection cycle, said control means being supplied with pre-selected input values of the variable parameters of injection pressure, maximum flow and acceleration to generate control signals indicative thereof which are supplied to said servo-control, wherein means are provided for generating reference operation signals which are representative of the movement of said ram during an injection cycle, and said servo-control includes means for comparing said control signals with said reference operation signals to provide a differential signal which is applied to ram actuating means to control movement of said ram during said injection cycle.

14. The injection molding apparatus of claim 13, wherein,
a plurality of said input values for each of the variable parameters of flow rate and acceleration or deceleration are programmed into said PLC to create an acceleration/deceleration function which will implement pre-selected multiple flow rates during an injection cycle.

15. The injection molding apparatus of claim 14, wherein,
each of said multiple flow rates is implemented at pre-selected time intervals during an injection cycle.

16. The injection molding apparatus of claim 14, wherein,
means are provided in said control system to generate a reference control signal which is representative of the pressure of said fluid molding material during an injection cycle, wherein each of said multiple flow rates is implemented at a pre-selected pressure during an injection cycle.

17. The injection molding apparatus of claim 14, wherein, at least one of said multiple flow rates is implemented at a pre-selected time during an injection cycle and said control system includes means to generate a control signal representative of the pressure of said fluid molding material during an injection cycle, wherein at least one of said multiple flow rates is implemented at a pre-selected pressure during an injection cycle.

18. The injection molding apparatus of claim 2, wherein,
said servo-control comprises integrating circuit means operable to provide a reference control signal of variable rate of change of the movement of said ram which will be compared with said control signal representative of the movement desired for said ram to cause movement of said ram at a pre-selected velocity and acceleration during an injection cycle.

19. The injection molding apparatus of claim 2, wherein,
said PLC of said control means is networked via a local area network LAN to a central control means adapted to program said PLC to generate said control signals and implement operation of the apparatus during an injection cycle.

20. The injection molding apparatus of claim 19, wherein,
said central control means is adapted to receive said operation signals from each of said control means on the LAN to allow information relating to said operation signals indicative of variable parameters of an injection cycle to be used in quality and production control operations, for each of said apparatus networked on said LAN.

21. The injection molding apparatus of claim 20, wherein,
said central control means includes a display means and said quality and production control operations include visual monitoring of the variable parameters of an injection cycle for a particular injection molding apparatus networked to said central control means.

22. The injection molding apparatus of claim 20, wherein,
said quality and production control operations include the generation of reports based upon accumulated information of the operation of each of said molding apparatus being networked to said central control means during multiple injection cycles to indicate function of each of said apparatus over time.

23. The injection molding apparatus of claim 2, wherein,
said PLC of said control means is programmed to cause movement of the ram by ram actuating means in the fluid charging or fluid injection directions in a pre-determined sequence to effect multiple flow rates in an injection cycle.

24. The injection molding apparatus of claim 2, wherein,
a fluid injection nozzle which is movable into and out of engagement with said molding die is provided, wherein said nozzle is selectively connected with said source of fluid molding material, and said movable ram is operable to force said fluid molding material through said nozzle under pressure, and said control means includes means to initiate the movement of said nozzle into and out of engagement with said molding die at a pre-selected height.

25. The injection molding apparatus of claim 2, wherein,
platen means are provided to be moved into and out of clamping engagement with said molding die so as to retain said molding die in a pre-determined position during an injection cycle, wherein said control means includes means to initiate the movement of said platen means.

26. The injection molding apparatus of claim 2, wherein,
said servo-control circuit is a closed loop type control in which means for actuating said movable ram are provided to generate a reference signal causing movement of the ram, and means operatively connected to said ram to provide an input signal to said servo-control indicative of the actual movement of said ram, wherein means are provided for comparing said reference signal with said input signal to provide a differential signal utilized to control and modify movement of said ram.

27. The injection molding apparatus of claim 2, wherein,
said servo-control circuit comprises transducer means responsive to the fluid pressure of the fluid molding material during an injection cycle to provide an input signal representative of said fluid pressure, and said control means generates a control signal indicative of the desired fluid pressure, wherein said input signal and said control signal are compared to generate a differential signal applied to ram actuating means to control and modify movement of said ram.

28. An investment pattern molding machine comprising a source of a fluid molding material and a moveable ram, wherein said fluid molding material is forced into a molding die by means of said moveable ram which is caused to move in fluid injection and fluid charging directions as part of an injection cycle, wherein flow of said fluid molding material into said molding die is controlled by movement of said ram in said fluid injection and charging directions, the movement of said ram being controlled by control means including a programmable logic controller, PLC, and a servo-control circuit coupled by means of an interface circuit, with said servo-control circuit acting to sense and control the movement of said ram and the pressure of said fluid molding material as generated by said moveable ram forcing said fluid molding material into said molding die,
said servo-control circuit being responsive to control signals developed by said PLC which is programmed with predetermined parameters correlating to a plurality of variable physical parameters associated with a predetermined injection cycle for a particular molding die to implement said predetermined injection cycle, wherein said control signals include a plurality of signals corresponding to movement of said ram in said fluid injection and charging directions, said plurality of signals implementing multiple flow rates and controlling acceleration or deceleration of the flow of said molding material during an injection cycle, and wherein, said variable physical parameters are continuously monitored and controlled by means of said servo-control circuit during said injection cycle.

* * * * *